(12) United States Patent
Yamazaki et al.

(10) Patent No.: US 8,274,012 B2
(45) Date of Patent: Sep. 25, 2012

(54) WELDING CONTROL APPARATUS FOR PULSE ARC WELDING OF CONSUMED ELECTRODE TYPE, ARC LENGTH CONTROL METHOD FOR USE WITH THE SAME, AND WELDING SYSTEM INCLUDING THE WELDING CONTROL APPARATUS

(75) Inventors: Kei Yamazaki, Fujisawa (JP); Keiichi Suzuki, Fujisawa (JP); Masahiro Honma, Fujisawa (JP); Eiji Sato, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 395 days.

(21) Appl. No.: 12/684,314

(22) Filed: Jan. 8, 2010

(65) Prior Publication Data
US 2010/0200553 A1 Aug. 12, 2010

(30) Foreign Application Priority Data

Feb. 12, 2009 (JP) ................................. 2009-029271

(51) Int. Cl.
*B23K 9/10* (2006.01)
(52) U.S. Cl. .......... 219/130.51; 219/130.21; 219/130.33
(58) Field of Classification Search ............. 219/130.51, 219/130.31–130.33, 130.21, 136
See application file for complete search history.

(56) References Cited

U.S. PATENT DOCUMENTS

| 7,067,767 | B2 * | 6/2006 | Hsu ......................... 219/130.51 |
| 2005/0056630 | A1 | 3/2005 | Tong |
| 2007/0210048 | A1 | 9/2007 | Koshiishi et al. |
| 2008/0237196 | A1 | 10/2008 | Yamazaki et al. |

FOREIGN PATENT DOCUMENTS

| JP | 60-108174 | 6/1985 |
| JP | 3147046 | 1/2001 |
| JP | 2002-361417 | 12/2002 |
| JP | 2007-237270 | 9/2007 |

* cited by examiner

*Primary Examiner* — David Lam
(74) *Attorney, Agent, or Firm* — Oblon, Spivak, McClelland, Maier & Neustadt, L.L.P.

(57) ABSTRACT

A welding control apparatus includes an integrator for starting calculation of a voltage error integral value Sv2 when a first pulse period ends and a second pulse period starts in a pulse cycle, based on various data. The apparatus also includes a comparator for comparatively determining whether a value of the voltage error integral value Sv2 provided as the calculation result has become 0, and a waveform generator for terminating the relevant pulse cycle and starting a next pulse cycle when the value of the voltage error integral value Sv2 is 0. Where $$Sv2 = \int \{Ks(Io2 - Is2) + Vs2 - Vo2\} dt \qquad (1).$$

7 Claims, 14 Drawing Sheets

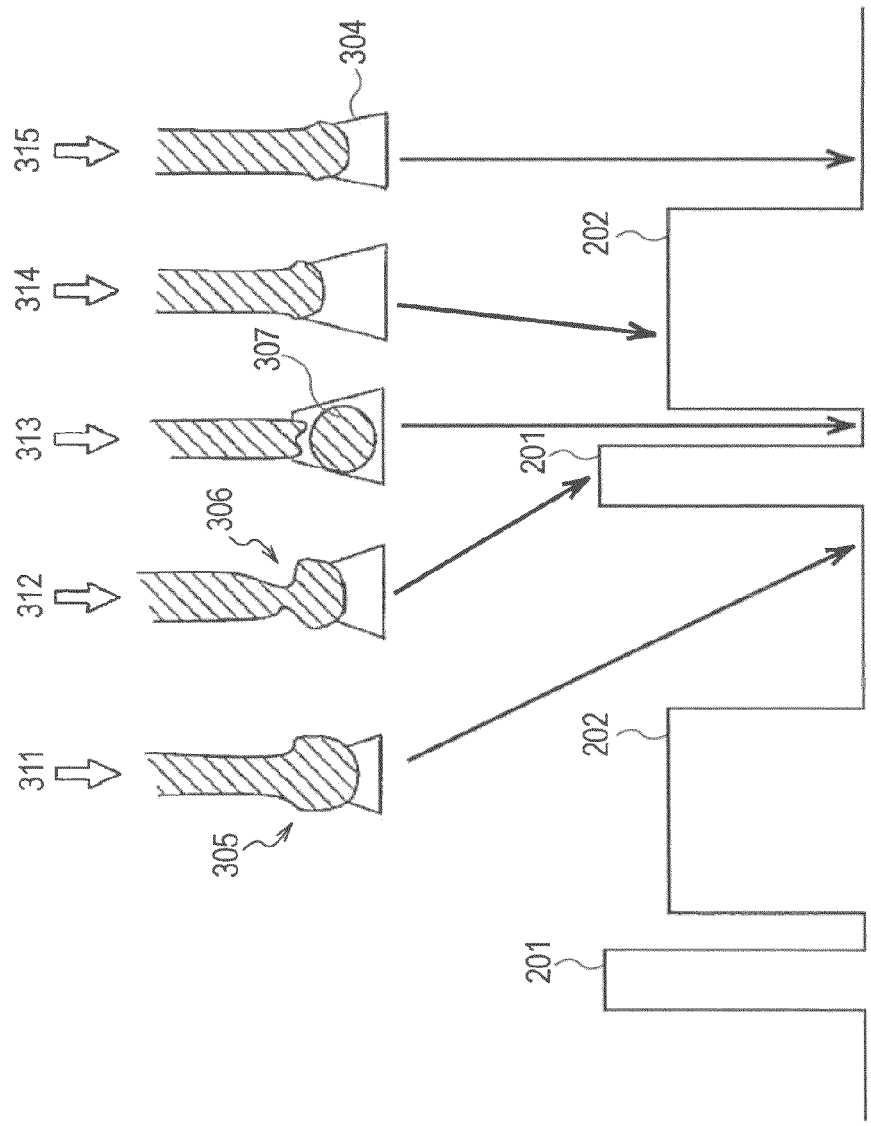

WELDING CONTROL APPARATUS FOR PULSE ARC WELDING OF CONSUMED ELECTRODE TYPE, ARC LENGTH CONTROL METHOD FOR USE WITH THE SAME, AND WELDING SYSTEM INCLUDING THE WELDING CONTROL APPARATUS

BACKGROUND OF THE INVENTION

1. Field of the Invention

The present invention relates to an arc length control technique adapted for pulse arc welding of consumed electrode type using, as shield gas, carbon dioxide (gas) or a gas mixture containing carbon dioxide as a main component.

2. Description of the Related Art

From the necessity of properly keeping an arc length to maintain satisfactory welding quality, there is known an arc length control technique for suppressing changes of the arc length during the welding (see Japanese Unexamined Patent Application Publication No. 2002-361417 and Japanese Patent No. 3147046). Qualitatively, the arc length is determined based on balance between a feed speed of a welding wire (i.e., a wire feed speed) and a melting rate of the wire. More specifically, if the wire feed speed varies during the welding due to, e.g., feed resistance caused in a wire feed path, the balance between the wire feed speed and the melting rate is lost, thus causing a variation in the arc length. Also, the arc length varies due to, e.g., changes of the tip-to-base material distance (i.e., the distance between a tip and a base material), which are caused by, e.g., shaking of hands of a welding worker. In order to suppress the variation in the arc length caused by the above-mentioned disturbances, therefore, a welding current corresponding to the melting rate needs to be adjusted depending on changes of a welding voltage corresponding to the arc length. Arc length control described in Japanese Unexamined Patent Application Publication No. 2002-361417 will be described below.

In a general pulse arc welding of consumed electrode type, a gas mixture of Ar-5 to 30% of $CO_2$ is used as shield gas (MAG pulse welding). In the known technique, as illustrated in FIG. 15, waveforms of a welding current and a welding voltage are controlled respectively by using a pulse current waveform and a pulse voltage waveform (referred to collectively as a "pulse waveform"). In FIG. 15, the vertical axis of the waveform illustrated in the upper side represents a detected value Io of the welding current, and the vertical axis of the waveform illustrated in the lower side represents an instantaneous value Vo of the welding voltage. The horizontal axis of each of the waveforms represents time t.

In the welding control illustrated in FIG. 15, a higher welding current than a mean welding current is supplied during a peak period Tp to release (separate) a droplet of molten metal. Correspondingly, a welding voltage value during the peak period Tp becomes Vp. During a base period Tb subsequent to the peak period Tp, a lower welding current than the mean welding current is supplied to avoid transfer of the droplet. Correspondingly, a welding voltage value during the base period Tb becomes Vb. By repeating the peak period Tp and the base period Tb as a combined pulse cycle Tpb (one cycle), the transfer of one droplet per pulse is carried out in sync with the pulse waveform. As a result, welding can be performed with less sputtering than the case not using the above-described pulse waveform.

In the upper side of FIG. 15, a time mean value of a waveform area indicated by hatching in a period between a start time t(n) of the n-th pulse and a start time t(n+1) of the (n+1)-th pulse, i.e., in the n-th pulse cycle Tpb(n), represents a mean welding current value Iw(n). Similarly, in the lower side of FIG. 15, a time mean value of a waveform area indicated by hatching represents a mean welding voltage value Vw(n).

In general, because stability of an arc length control system is greatly affected by the gradient of an external characteristic of a welding power supply, the gradient of the external characteristic needs to be set to a proper value depending on, e.g., welding conditions (i.e., setting of the wire feed speed, the welding voltage, etc.), the wire type, and the composition of the shield gas. FIG. 16 illustrates one example of the gradient Ks of the external characteristic set depending on a certain case of the welding conditions, the wire type, and the composition of the shield gas. The arc length control can be realized by performing output control such that, in the certain case of the welding conditions, the wire type, and the composition of the shield gas, an operating point for the welding current and the welding voltage during the welding is kept positioned on a straight line in FIG. 16, which represents the gradient Ks of the external characteristic. This has the same meaning as performing output control in such a way that the mean welding current value Iw(n) and the mean welding voltage value Vw(n), illustrated in FIGS. 15 and 16, satisfy the relationship expressed by the following formula (101). In the formula (101), Is is a setting value of the welding current, which indicates a setting condition set in advance, and Vs is similarly a setting value of the welding voltage.

$$Vw(n)=Ks\{Is-Iw(n)\}+Vs \tag{101}$$

In FIG. 16, for example, a position P1 of the setting condition is set as a reference position. When the arc length increases during the welding, the detected value of the welding voltage increases and the mean welding voltage value Vw(n) becomes higher than the setting value Vs of the welding voltage, as seen from FIG. 16. In that case, because the operating point is moved from the position P1 to P2 on the straight line representing the gradient Ks of the external characteristic, the mean welding current value Iw(n) becomes lower than the setting value Is of the welding current, as seen from FIG. 16. Hence the wire melting rate reduces, whereby the arc length also reduces. Consequently, the operating point is moved in a direction converging to the position P1.

Conversely, when the arc length reduces during the welding, the detected value of the welding voltage reduces and the mean welding voltage value Vw(n) becomes lower than the setting value Vs of the welding voltage, as seen from FIG. 16. In that case, because the operating point is moved from the position P1 to P3 on the straight line representing the gradient Ks of the external characteristic, the mean welding current value Iw(n) becomes higher than the setting value Is of the welding current, as seen from FIG. 16. Hence the wire melting rate increases, whereby the arc length also increases. Consequently, the operating point is moved in a direction converging to the position P1.

Thus, setting the external characteristic having the proper gradient Ks is equivalent to controlling a change amount of the welding current depending on a change of the welding voltage. As a result, the change amount of the arc length can be suppressed. In more detail, a welding power supply apparatus described in Japanese Unexamined Patent Application Publication No. 2002-361417 performs the arc length control as follows. Here, assuming the instantaneous value of the welding current and the instantaneous value of the welding voltage detected at a certain point in time to be Io and Vo, respectively, a voltage error integral value Svb corresponding to errors between respective detected values and the setting value Vs of the welding voltage and the setting value Is of the welding current within a pulse cycle is defined by the following formula (102):

$$Svb = \int \{Ks(Io-Is) + Vs - Vo\} dt \qquad (102)$$

In the welding power supply apparatus described in Japanese Unexamined Patent Application Publication No. 2002-361417, calculation of Svb in the formula (102) is started at the time t(n) when the n-th pulse cycle Tpb(n) has started. Then, at a time when Svb=0 is resulted during the n-th base period Tb after the end of the preset n-th peak period Tp, the n-th pulse cycle Tpb(n) is brought to an end. By setting that time to be t(n+1), the (n+1)-th pulse cycle is started. As a result of repeating the above-described steps, the operating point can be held on a line corresponding to the gradient Ks of the external characteristic represented by the above formula (101), and the arc length control can be realized in such a way that the arc length is adjusted in units of one pulse cycle (one droplet).

On the other hand, the technique described in Japanese Patent No. 3147046 relates to arc welding of consumed electrode type using shield gas containing carbon dioxide as a main component, and it performs arc length control by generating a complex pulse waveform as illustrated in FIG. 17. A pulse waveform generation means described in the above-cited Japanese Patent employs constant current control and constant voltage control in a combined manner. The pulse waveform illustrated in FIG. 17 alternately includes a predetermined peak period Tp and a predetermined base period Tb. The pulse waveform generation means outputs a constant voltage corresponding to an initial voltage Vc during an initial peak period Tc that starts from the same start point as the peak period Tp. In a subsequent peak period (Tp−Tc), the pulse waveform generation means outputs a constant peak voltage Vp. Further, the pulse waveform generation means performs, during the base period Tb, the constant current control based on a pulse waveform provided by a predetermined base current value Ib.

Moreover, with the technique described in Japanese Patent No. 3147046, after a droplet release detection means has detected release of a droplet of molten metal, the pulse waveform generation means outputs a predetermined current value Ir only during an output correction time Tr. In the peak period immediately after the elapse of the output correction time Tr, the pulse waveform generation means performs, without generating the waveform in the initial peak period, the constant voltage control such that the detected voltage is held at the peak voltage Vp over an entire region of the pulse waveform. The initial peak period Tc and the initial voltage Vc are set to prevent the pulse current from rising excessively. In other words, the initial peak period Tc and the initial voltage Vc are set to proper values to minimize an arc force that is imposed on the droplet when the droplet is released in an initial stage of the peak period.

In addition, with the technique described in Japanese Patent No. 3147046, the base period Tb is set as a fixed parameter. Therefore, when the balance between the wire feed speed and the melting rate is lost due to disturbances, the arc length control can be performed so as to compensate for the arc length by increasing or reducing the pulse peak current during the peak period (Tp−Tc), or by increasing or reducing the pulse peak current during the peak period Tp immediately after the output correction time Tr. For that reason, the technique described in Japanese Patent No. 3147046 is suitable for such a situation that the tip-to-base material distance and the welding conditions are hardly changed during the welding.

The inventors of this application have previously proposed a pulse arc welding method using, as shield gas, carbon dioxide alone or a gas mixture containing carbon dioxide as a main component and alternately outputting two types of pulse waveforms having different pulse peak current levels per cycle, wherein an arc length is controlled to be constant by adjusting one or more of a peak current, a base current, a peak period, and a base period of a second pulse, which serves to shape a droplet of molten metal, within such an extent that one droplet is transferred per cycle and that the transfer of one droplet per cycle is not disturbed even when the distance between a contact tip and a base material distance is changed (see Japanese Unexamined Patent Application Publication No. 2007-237270).

However, the related art disclosed in Japanese Unexamined Patent Application Publication No. 2007-237270 still has a room for improvement in the technique of suppressing a variation in the arc length caused by disturbances. From that point of view, the arc length control described in Japanese Unexamined Patent Application Publication No. 2002-361417 is discussed below. The described arc length control is based on precondition that the mean welding voltage value Vw(n) in the n-th pulse cycle Tpb(n) is substantially proportional to the arc length in the n-th pulse cycle. Such precondition is satisfied by the pulse arc welding method in which a gas mixture of Ar-5 to 30% of $CO_2$ is used as the shield gas and the simple pulse waveform, illustrated in FIG. 15, is repeated. However, the above-described precondition cannot be applied to the technique disclosed in Japanese Unexamined Patent Application Publication No. 2007-237270. In other words, the above-described precondition is not satisfied in the pulse arc welding of consumed electrode type in which carbon dioxide alone or the gas mixture containing carbon dioxide as a main component is used as the shield gas and one droplet is transferred per cycle by using two types of pulse waveforms having different peak current levels in one pulse cycle.

Further, in the technique disclosed in Japanese Unexamined Patent Application Publication No. 2007-237270, it is also supposed, for example, to perform welding in a manner of weaving the tip within a gap (groove) such that the tip-to-base material distance is momentarily changed. On the other hand, in the arc length control described in Japanese Patent No. 3147046, since the base period Tb is set as a fixed parameter, the arc length is compensated for by increasing or reducing the pulse peak current during a predetermined period. Therefore, when the arc length control described in Japanese Patent No. 3147046 is applied to the welding that the tip-to-base material distance is momentarily changed with the weaving of the tip within the gap, the peak current is abruptly increased or reduced. For that reason, when the welding is performed in such a manner, the molten metal remaining on a wire after the release of the droplet or the droplet under formation is frequently caused to scatter, as spatters, due to an arc reaction force.

In the technique described in Japanese Patent No. 3147046, because of generating the pulse waveform illustrated in FIG. 17, the current value greatly varies per cycle in the period where the droplet is formed, i.e., the peak period (Tp−Tc) or the peak period Tp immediately after the output correction time Tr. This results in the problem of causing a variation in droplet size and impairing regularity of the droplet transfer.

Moreover, in the pulse arc welding as represented by the technique disclosed in Japanese Unexamined Patent Application Publication No. 2007-237270, a suspensory shaping process for the droplet in the base period Tb is very important.

If the base period Tb is too short, the droplet cannot be released by the next pulse. Also, if the base period Tb is too long, the droplet contacts a molten metal pool, thus generating spatters by a short-circuiting. Hence, coping with those problems has been demanded.

SUMMARY OF THE INVENTION

Accordingly, an object of the present invention is to solve the above-mentioned problems and to provide an arc length control technique adapted for pulse arc welding of consumed electrode type using, as shield gas, carbon dioxide (gas) or a gas mixture containing carbon dioxide as a main component, which can precisely suppress a variation in arc length caused by disturbances.

Another object of the present invention is to provide an arc length control technique which can suppress generation of spatters without impairing regularity of the droplet transfer even when the tip-to-base material distance is momentarily changed with weaving of the tip within a gap (grove).

To achieve the above-described objects, the inventors of this application have made intensive studies on pulse arc welding of consumed electrode type using, as shield gas, carbon dioxide or a gas mixture containing carbon dioxide as a main component and generating two types of different pulse waveforms within one pulse cycle to perform transfer of one droplet per pulse cycle, i.e., a first pulse waveform which serves to release (separate) the droplet, and a second pulse waveform which serves to melt a wire after the release of the droplet and serves to grow and shape the droplet. As a result, the inventors have found that correlation between instantaneous values of a welding voltage detected at all timings over the pulse cycle and an arc length is relatively low, whereas correlation between an instantaneous value of the welding voltage detected in a period of the second pulse waveform, i.e., in a second pulse period, and the arc length is relatively high.

On the basis of such finding, the present invention provides a welding control apparatus for use in pulse arc welding of consumed electrode type using, as shield gas, carbon dioxide or a gas mixture containing carbon dioxide as a main component, the welding control apparatus comprising a current detector for detecting a welding current of a welding power supply; a voltage detector for detecting a welding voltage of the welding power supply; a constriction detector for detecting a constriction of a droplet of molten metal based on at least one of the detected welding current and welding voltage; a waveform generator for, during one pulse cycle made up of a first pulse period including a peak period and a base period of a first pulse waveform and a second pulse period including a peak period and a base period of a second pulse waveform, alternately generating two types of pulse waveforms differing in at least one of a pulse peak current and a pulse width to be output to the welding power supply based on preset waveform parameters such that the first pulse waveform for releasing the droplet from a wire distal end and the second pulse waveform for shaping the droplet are output as the two types of pulse waveforms in order named for transfer of one droplet, the waveform generator immediately changing over, when the constriction of the droplet is detected, a current value of a first pulse to a predetermined value lower than a current value at the time of detection of the constriction; an integrator for receiving, as parameters in a formula (1) given below, inputs of preset various data of information regarding a gradient Ks of an external characteristic of the welding power supply, a welding current setting value Is2 in the second pulse period, and a welding voltage setting value Vs2 in the second pulse period, and further receiving inputs of various data of information regarding an instantaneous value Io2 of the welding current detected in the second pulse period and an instantaneous value Vo2 of the welding voltage detected in the second pulse period, the integrator starting calculation of a voltage error integral value Sv2 expressed by the following formula (1) from a time when the first pulse period ends and the second pulse period starts in the pulse cycle and bringing the calculation to an end at a time when a result of the calculation has become 0; and a comparator for comparatively determining whether a value of the voltage error integral value Sv2 provided as the calculation result has become 0, wherein, for each pulse cycle, the waveform generator terminates the relevant pulse cycle and starts a next pulse cycle at a time when the value of the voltage error integral value Sv2 has become 0:

$$Sv2=\int\{Ks(Io2-Is2)+Vs2-Vo2\}dt \quad (1)$$

With those features, the welding control apparatus operates so as to start the calculation of the voltage error integral value Sv2, expressed by the formula (1), per pulse cycle by using the instantaneous value Io2 of the welding current and the instantaneous value Vo2 of the welding voltage both detected in the second pulse period, which corresponds to the second pulse waveform for shaping the droplet, and further to terminates the relevant pulse cycle and to start a next pulse cycle at a time when the value of the voltage error integral value Sv2 has become 0. Thus, a length of the base period of the second pulse period within the pulse cycle is changed. As a result, the welding control apparatus can realize arc length control with changes of pulse frequency.

More specifically, because the first pulse period within the pulse cycle provides a period of the first pulse waveform serving to release the droplet, the arc length in the first pulse period is governed by droplet behaviors in processes of deformation and release of the droplet. Accordingly, the instantaneous value of the welding voltage detected in the first pulse period cannot be said as precisely reflecting the change of the arc length, which is caused by a loss of balance between melting and feed of a wire, and it is affected by the droplet behaviors to a large extent. On the other hand, because the second pulse period provides a period of the second pulse waveform serving to melt a wire and to grow a droplet in its peak period after the release of the droplet in the preceding pulse cycle and further to shape the droplet in its base period, the droplet during the second pulse period is not released from the wire in principle and the droplet shape does not deform extremely. Accordingly, the arc length is governed by the balance between a wire melting rate and a wire feed speed. Stated another way, the instantaneous value of the welding voltage detected in the second pulse period precisely reflects the change of the arc length, which is caused by a loss of the balance between the melting and the feed of the wire. For that reason, by using the instantaneous value Io2 of the welding current and the instantaneous value Vo2 of the welding voltage in the second pulse period, which have higher correlation with respect to the actual arc length, a variation in the arc length caused by disturbances can be more precisely suppressed than the known arc length control using the welding current value and the welding voltage value which are detected over the entire pulse cycle.

In the welding control apparatus according to the present invention, the waveform generator may generate the second pulse waveform by calculating, based on a formula (2) given below, an addition/reduction value to increase or decrease a value of the peak period of the second pulse period among the preset waveform parameters with respect to a setting value, and the waveform generator may receive, as parameters in the following formula (2), inputs of preset various data of information regarding a reference value Tb2ref of the base period of the second pulse period and a change gain Kstp for the peak period of the second pulse period, and may calculate an addition/reduction value ΔTp2($n$), expressed by the following formula (2), of the peak period of the second pulse period in the current n-th pulse cycle by using the received various data of the information and an actually measured value Tb2($n$−1) of the base period of the second pulse period in the preceding (n−1)-th pulse cycle:

$$\Delta Tp2(n) = Kstp\{Tb2\text{ref} - Tb2(n-1)\} \qquad (2)$$

With those features, the welding control apparatus operates so as to calculate, based on the formula (2), the addition/reduction value ΔTp2($n$) of the peak period of the second pulse period in the n-th pulse cycle by using the preset values of the parameters and an actually measured value of the base period of the second pulse period in the (n−1)-th pulse cycle. Accordingly, the influence caused by changing the base period of the second pulse period in the preceding pulse cycle can be compensated for by increasing or decreasing the peak period in the present pulse cycle and providing an integral value, which is obtained by integrating the peak current value for a peak period corresponding to the increase or decrease of the peak period. In other words, the welding control apparatus according to the present invention can suppress an influence resulting from a change of the base period of the second pulse period by changing the peak period of the second pulse period, as an auxiliary process while executing the arc length control with changes of the pulse frequency as a main process. For example, when the base period is shortened in the preceding pulse cycle, the influence of the frequency change in the second pulse period or over the entire pulse cycle can be lessened by lengthening the peak period in the present pulse cycle. Therefore, generation of spatters can be suppressed without impairing the regularity of the droplet transfer even when the tip-to-base material distance is momentarily changed with weaving of the tip within the gap (grove).

Further, the waveform generator may compare a maximum value of an increase range and a maximum value of a decrease range for the addition/reduction value ΔTp2($n$), which are set in advance such that the value of the peak period of the second pulse period is held at a proper value, with a calculation result of the addition/reduction value ΔTp2($n$) of the peak period of the second pulse period, and may generate the second pulse waveform by setting the addition/reduction value, by which the value of the peak period of the second pulse period is increased or decreased with respect to the setting value, to the maximum value of the increase range or the maximum value of the decrease range when an absolute value of the calculation result exceeds the maximum value of the increase range or the maximum value of the decrease range.

With those features, when the welding control apparatus performs, as the auxiliary process for the arc length control, the process of changing the peak period of the second pulse period, the peak period of the second pulse period is not excessively changed because the maximum value of the increase range and the maximum value of the decrease range for the addition/reduction value ΔTp2($n$) are set in advance. It is hence possible to avoid the adverse influence of disturbing the regularity of the droplet transfer, which would be caused if the peak period of the second pulse period is excessively changed.

Alternatively, in the above-described welding control apparatus, the waveform generator may generate the second pulse waveform by calculating, based on a formula (3) given below, an addition/reduction value to increase or decrease a value of the peak current in the second pulse period among the preset waveform parameters with respect to a setting value, and the waveform generator may receive, as parameters in the following formula (3), inputs of preset various data of information regarding a reference value Tb2ref of the base period of the second pulse period and a change gain Ksip for the peak current in the second pulse period, and may calculate an addition/reduction value ΔIp2($n$), expressed by the following formula (3), of the peak current in the second pulse period in the current n-th pulse cycle by using the received various data of the information and an actually measured value Tb2($n$−1) of the base period of the second pulse period in the preceding (n−1)-th pulse cycle:

$$\Delta Ip2(n) = Ksip\{Tb2\text{ref} - Tb2(n-1)\} \qquad (3)$$

With those features, the welding control apparatus operates so as to calculate, based on the formula (3), the addition/reduction value ΔIp2($n$) of the peak current in the second pulse period in the n-th pulse cycle by using the preset values of the parameters and an actually measured value of the base period of the second pulse period in the (n−1)-th pulse cycle. Accordingly, the influence caused by changing the base period of the second pulse period in the preceding pulse cycle can be compensated for by increasing or decreasing the peak current in the present pulse cycle and providing an integral value, which is obtained by integrating the peak current value for a peak period corresponding to the increase or decrease of the peak period. In other words, the welding control apparatus according to the present invention can suppress an influence resulting from a change of the base period of the second pulse period by changing the peak current in the second pulse period, as an auxiliary process while executing the arc length control with changes of the pulse frequency as a main process. For example, when the base period is shortened in the preceding pulse cycle, the influence of the frequency change in the second pulse period or over the entire pulse cycle can be lessened by increasing the peak current in the present pulse cycle. Therefore, generation of spatters can be suppressed without impairing the regularity of the droplet transfer even when the tip-to-base material distance is momentarily changed with weaving of the tip within the gap (grove).

Further, the waveform generator may compare a maximum value of an increase range and a maximum value of a decrease range for the addition/reduction value ΔIp2($n$), which are set in advance such that the value of the peak current in the second pulse period is held at a proper value, with a calculation result of the addition/reduction value ΔIp2($n$) of the peak current in the second pulse period, and may generate the second pulse waveform by setting the addition/reduction value, by which the value of the peak current in the second pulse period is increased or decreased with respect to the setting value, to the maximum value of the increase range or the maximum value of the decrease range when an absolute value of the calculation result exceeds the maximum value of the increase range or the maximum value of the decrease range.

With those features, when the welding control apparatus performs, as the auxiliary process for the arc length control, the process of changing the peak current in the second pulse period, the peak current in the second pulse period is not excessively changed because the maximum value of the increase range and the maximum value of the decrease range for the addition/reduction value ΔIp2($n$) are set in advance. It is hence possible to avoid the adverse influence of disturbing the regularity of the droplet transfer, which would be caused if the peak current in the second pulse period is excessively changed.

To achieve the above-described objects, the present invention also provides an arc length control method for use with a welding control apparatus, the arc length control method being used in pulse arc welding of consumed electrode type that carbon dioxide or a gas mixture containing carbon dioxide as a main component is used as shield gas, and that a first pulse waveform for releasing a droplet of molten metal from a wire distal end and a second pulse waveform for shaping the droplet are output, as two types of pulse waveforms differing in at least one of a pulse peak current and a pulse width, during one pulse cycle in order named for transfer of one droplet, the welding control apparatus being operated to alternately generate the two types of pulse waveforms based on preset waveform parameters to be output to the welding power supply, and to immediately change over, when the constriction of the droplet is detected, a current value of a first pulse to a predetermined value lower than a current value at the time of detection of the constriction, the pulse cycle being made up of a first pulse period including a peak period and a base period of the first pulse waveform and a second pulse period including a peak period and a base period of the second pulse waveform, the arc length control method comprising the steps of detecting a welding current during the welding; detecting a welding voltage during the welding; receiving, as parameters in a formula (1) given below, inputs of preset various data of information regarding a gradient Ks of an external characteristic of the welding power supply, a welding current setting value $Is2$ in the second pulse period, and a welding voltage setting value $Vs2$ in the second pulse period; receiving, as the parameters in the following formula (1), inputs of various data of information regarding an instantaneous value $Io2$ of the welding current and an instantaneous value $Vo2$ of the welding voltage, which are detected in the second pulse period; starting calculation of a voltage error integral value $Sv2$ expressed by the following formula (1) from a time when the first pulse period ends and the second pulse period starts in the pulse cycle, and bringing the calculation to an end at a time when a result of the calculation has become 0; comparatively determining whether a value of the voltage error integral value $Sv2$ provided as the calculation result has become 0; and for each pulse cycle, terminating the relevant pulse cycle and starting a next pulse cycle at a time when the value of the voltage error integral value $Sv2$ has become 0, in a process of alternately generating the two types of pulse waveforms:

$$Sv2=\int\{Ks(Io2-Is2)+Vs2-Vo2\}dt \quad (1)$$

With those procedures, the arc length control method includes the steps of starting the calculation of the voltage error integral value $Sv2$, expressed by the formula (1), per pulse cycle by using the instantaneous value $Io2$ of the welding current and the instantaneous value $Vo2$ of the welding voltage both detected in the second pulse period, which corresponds to the second pulse waveform serving to shape the droplet and having higher correlation with the actual arc length, and terminating the relevant pulse cycle and starting a next pulse cycle at a time when the value of the voltage error integral value $Sv2$ has become 0. As a result, the arc length control method can realize satisfactory arc length control with changes of pulse frequency while precisely suppressing a variation in the arc length caused by disturbances.

To achieve the above-described objects, the present invention further provides a welding system comprising the above-described welding control apparatus, a wire feeder for feeding a wire to a torch through a wire feed path from a wire container, a welding power supply for driving the wire feeder and supplying a welding current to the wire, fed from the wire feeder to the torch, in accordance with a welding command signal which is output by the welding control apparatus based on the first pulse waveform and the second pulse waveform, an arc welding robot for holding the torch and moving the torch, and a robot control apparatus including a control panel through which commands indicating a welding path and welding work conditions are input, and controlling the arc welding robot in accordance with the input commands.

According to the present invention, since the welding control apparatus employs the instantaneous value $Io2$ of the welding current and the instantaneous value $Vo2$ of the welding voltage in the second pulse period within the pulse cycle, which have higher correlation with respect to the actual arc length, a variation in the arc length caused by disturbances can be more precisely suppressed than the known arc length control using the welding current value and the welding voltage value which are detected over the entire pulse cycle.

BRIEF DESCRIPTION OF THE DRAWINGS

FIG. 3 is an explanatory view illustrating time-serial changes of a distal end portion of a welding wire, which are progressed in accordance with the pulse waveform generated by the welding control apparatus according to the present invention;

FIG. 4A is a graph representing one example of measurement results, and FIG. 4B illustrates definition of the arc length;

DESCRIPTION OF THE PREFERRED EMBODIMENTS

Embodiments for carrying out a welding control apparatus, an arc length control method, and a welding system including the welding control apparatus according to the present invention will be described below with reference to the drawings. First, a summary of the arc length control method according to the embodiment is described along with a pulse arc welding process. Then, the principle of the arc length control method, the welding system, first to third embodiments of the welding control apparatus for realizing the arc length control method, and practical advantages of the arc length control method are described in order.

[Summary of Arc Length Control Method]

Figure 1:
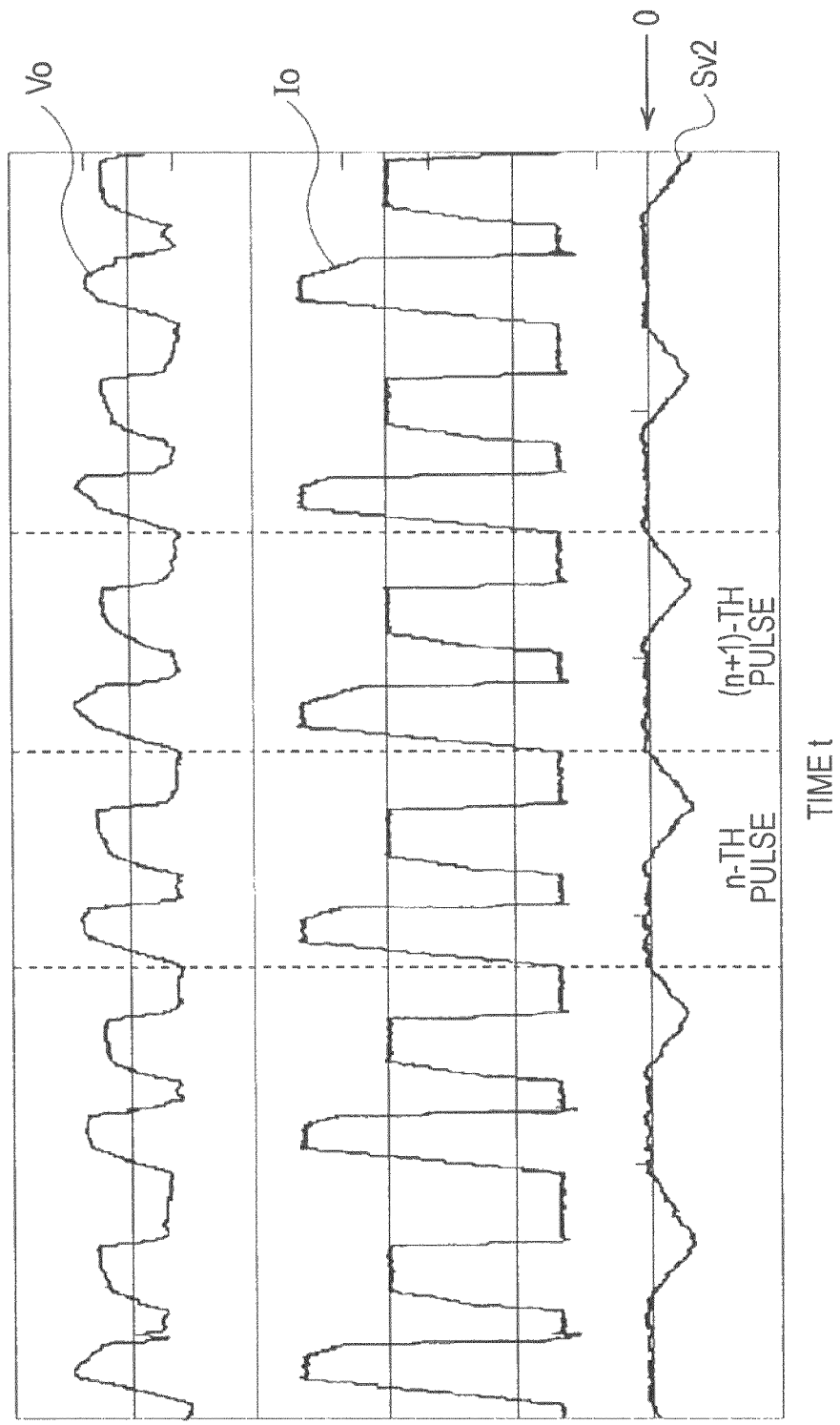
FIG. 1 is a timing chart of a welding voltage and a welding current measured in a control process performed by a welding control apparatus according to the present invention.
Figure 2:
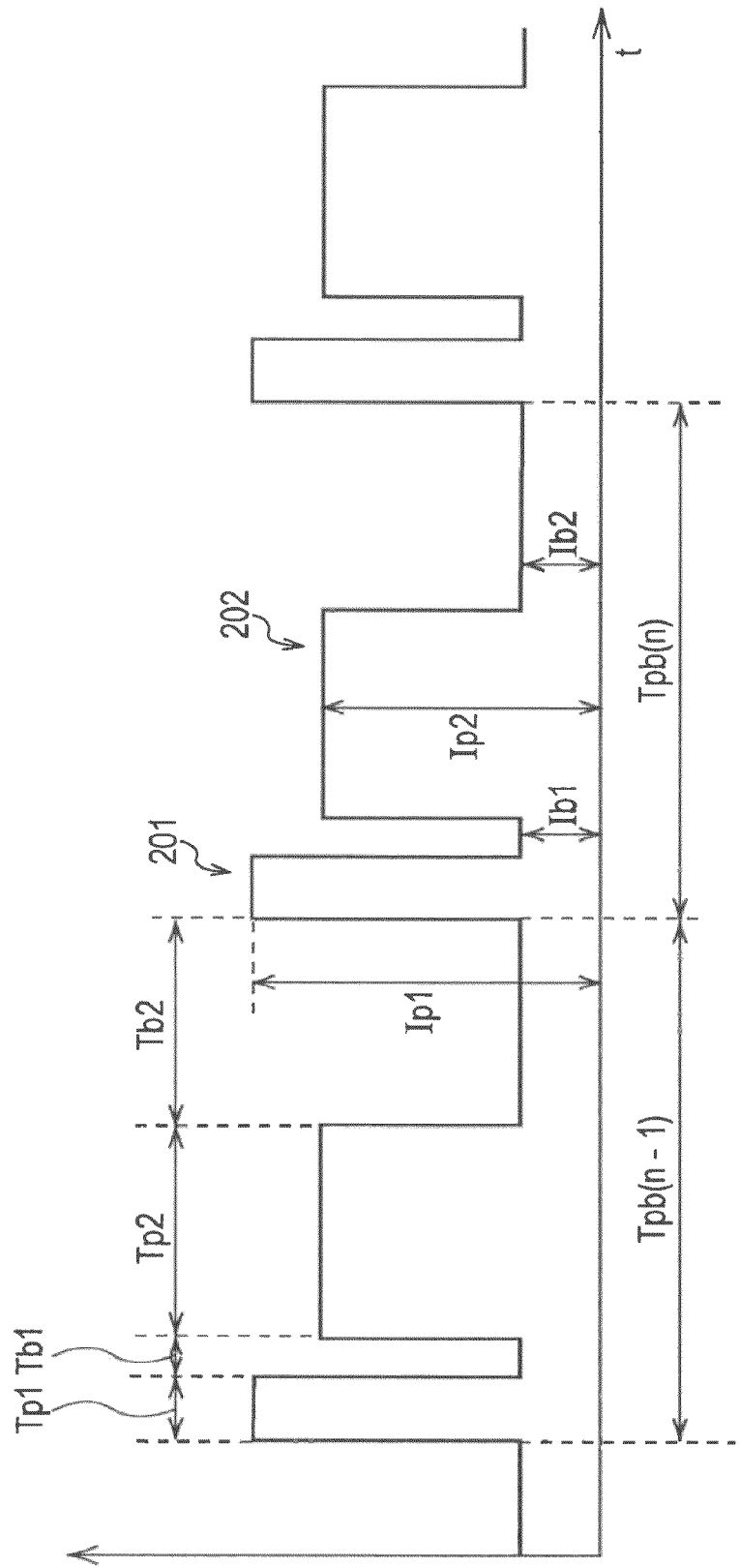
FIG. 2 is a timing chart illustrating one example of a pulse waveform generated by the welding control apparatus according to the present invention.

The summary of the arc length control method according to the embodiment will be described with reference to FIGS. 1 to 3. FIG. 1 is a timing chart of a welding voltage and a welding current measured in a control process performed by a welding control apparatus according to the present invention. FIG. 2 is a timing chart illustrating one example of a pulse waveform generated by the welding control apparatus according to the present invention, and FIG. 3 is an explanatory view illustrating time-serial changes of a distal end portion of a welding wire, which are progressed in accordance with the pulse waveform generated by the welding control apparatus according to the present invention.

The arc length control method according to the embodiment is premised on pulse arc welding of consumed electrode type in which the welding control apparatus according to the embodiment uses, as shield gas, carbon dioxide (gas) or a gas mixture containing carbon dioxide as a main component, generates two types of different pulse waveforms, illustrated in FIG. 2, alternately within one pulse cycle based on preset waveform parameters, and outputs the generated pulse waveforms to a welding power supply, thereby transferring one droplet of molten metal.

A first pulse 201 illustrated in FIG. 2 has a first pulse waveform serving to release (separate) the droplet from a wire distal end. A period including a peak period Tp1 and a base period Tb1 of the first pulse 201 is called a first pulse period. Herein, a peak current value Ip1 and a base current value Ib1 are set for the first pulse 201. The peak current value Ip1 is larger than a peak current value Ip2 of a second pulse 202.

A second pulse 202 illustrated in FIG. 2 has a second pulse waveform serving to shape the droplet. A period including a peak period Tp2 and a base period Tb2 of the second pulse 202 is called a second pulse period. Herein, a peak current value Ip2 and a base current value Ib2 are set for the second pulse 202.

One pulse cycle is made up of the first pulse period and the second pulse period. One pulse cycle is a period in which the first pulse 201 and the second pulse 202 are output in order named. In FIG. 2, a preceding (n−1)-th pulse period is denoted by Tpb(n−1). Also, a current n-th pulse period is denoted by Tpb(n). Further, in FIG. 2, the first pulse 201 and the second pulse 202 are each illustrated in a rectangular form. Strictly speaking, however, each pulse includes not only rising slope periods (i.e., a first pulse rising slope period and a second pulse rising slope period) during which a pulse level rises from a base current to a peak current, but also a pulse falling slope period during which the pulse level falls from the peak current to the base current.

In the welding control apparatus according to the embodiment, the welding voltage and the welding current are detected during the welding. When a constriction 306 of the droplet, illustrated in FIG. 3, is detected based on at least one of the welding voltage and the welding current, the current value of the first pulse 201 is immediately changed over to a predetermined value lower than a current value at the time of detection of the constriction. FIG. 3 illustrates an example in which the current value is changed over to a value of the base current. Details of droplet transfer are as follows.

In FIG. 3, a wire distal end 305, in a left end illustration denoted by 311, represents a state where the droplet has grown during the second pulse peak period (Tp2) in the preceding pulse cycle Tpb(n−1) after the release of the droplet. Because the current abruptly reduces during the second base period (Tb2), an upward pushing force acting upon the droplet weakens to such an extent that the droplet is caused to suspend from the wire distal end 305 while being shaped.

After coming into the first pulse peak period (Tp1), the droplet is deformed by an electromagnetic pinching force generated with the peak current, as denoted by 312, such that the constriction 306 is quickly generated. By detecting the generation of the constriction 306 before the release of the droplet, the welding current is immediately changed over to the first base current or another predetermined current lower than a current value at the time of detection of the constriction even during the first pulse peak period or during the first pulse falling slope period, thus providing a state where the welding current is reduced, as denoted by 313, at the moment when an arc moves to the wire side after the release of the droplet. Such a process makes it possible to greatly reduce small-particle spatters generated due to not only scattering of a wire portion at the constriction 306, but also scattering of the remaining molten metal after the release of the droplet.

Then, as denoted by 314, the droplet is grown during the second pulse peak period by previously setting the second pulse peak current value (Ip2) to such a level that the molten metal remaining on the wire after the release of the droplet will neither separate nor scatter. Thereafter, the droplet is shaped during the second base period (Tb2) as denoted by 315 for return to the state denoted by 311 again. In such a way, the transfer of one droplet per cycle can be very regularly realized.

One example of an instantaneous value Vo of the welding voltage detected in the welding control apparatus according to the embodiment is illustrated in an upper stage of FIG. 1, and an instantaneous value Io of the welding current is illustrated in a middle stage of FIG. 1. Further, the welding control apparatus executes calculation of a voltage error integral value Sv2 based on the following formula (1). One example of the result of calculating the voltage error integral value Sv2 is illustrated in a lower stage of FIG. 1:

$$Sv2 = \int \{Ks(Io2-Is2)+Vs2-Vo2\}dt \quad (1)$$

Among parameters in the formula (1), Ks is a gradient of an external characteristic of a welding power supply, and it is determined depending on a preset wire feed speed Wfs, setting of the welding voltage, the composition of the shield gas, and the wire type. Is2 is a setting value of the welding current in the second pulse period and is determined depending on a setting value Is of the welding current, which is set in advance. Vs2 is a setting value of the welding voltage in the second pulse period and is determined depending on a setting value Vs of the welding voltage, which is set in advance. Io2 is an instantaneous value of the welding current detected in the second pulse period. Vo2 is an instantaneous value of the welding voltage detected in the second pulse period.

The timing at which the welding control apparatus starts the calculation of the voltage error integral value Sv2, expressed by the formula (1), is a point in time when the second pulse period starts after the end of the first pulse period in each pulse cycle. As seen from FIG. 1, the voltage error integral value Sv2 is 0 during the first pulse period in the pulse cycle of the n-th pulse, for example, but the value Sv2 gradually lowers below 0 from the start time of the second pulse period therein. Further, the value Sv2 starts to rise after the end of the second pulse peak period (Tp2). At a time when the value Sv2 has become 0, the pulse cycle of the n-th pulse is ended and the pulse cycle of the (n+1)-th pulse is started.

[Principle of Arc Length Control]

The above-mentioned formula (1) differs from the formula (102), which is used in the related art described above, in extracting information only in the second pulse period. The reason why the formula (1) employs the information in the second pulse period is based on studies made on correlation between the arc length and the welding voltage in the pulse arc welding process. Details of the reason are as follows.

Figure 4A:
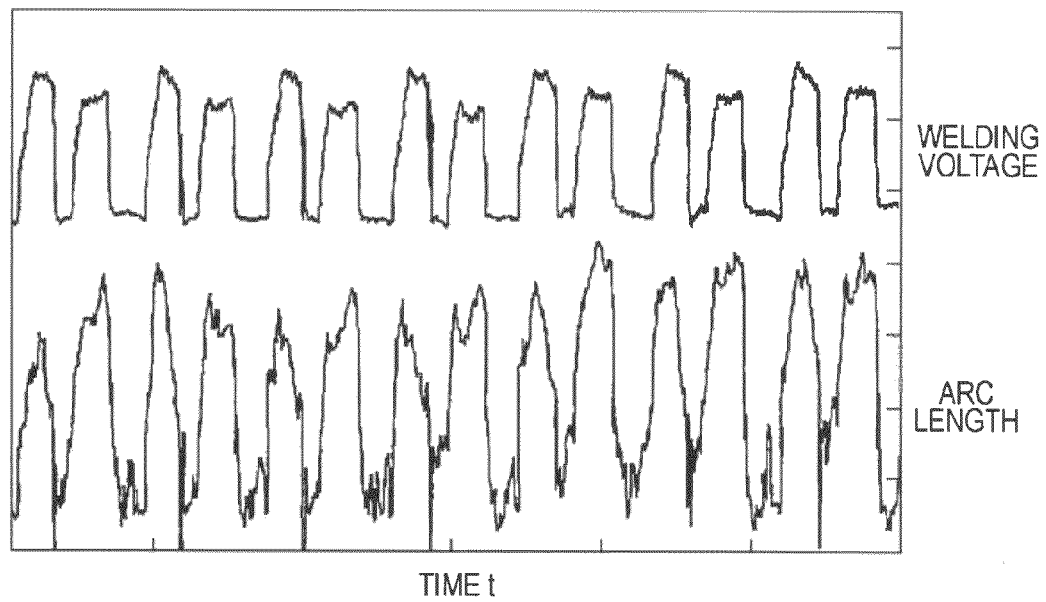
FIGS. 4A and 4B are explanatory views to explain measurement of a welding voltage and an arc length in carbon-dioxide pulse welding; specifically.

In order to study the correlation between the arc length and the welding voltage in the pulse arc welding process in the related art using the above-described formula (102), moving images of a welding arc were taken by a high speed camera at 6000 frames/sec in the case of using carbon dioxide as the shield gas and using the pulse waveform illustrated in FIG. 2, and the arc length was momentarily measured from the taken moving images. A graph plotting the momentarily measured arc length is illustrated in FIG. 4A as the measurement result of the arc length. FIG. 4A also illustrates the waveform of the welding voltage measured at the same time.

Figure 4B:
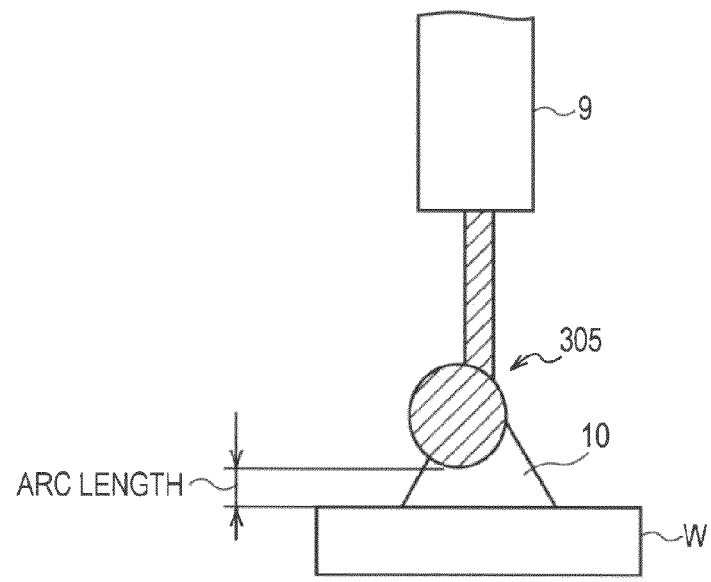

As illustrated in FIG. 4B, the arc length is defined as a distance from a lower end of the droplet at the distal end 305 of the wire, which is fed from a torch 9 toward a workpiece W to be welded, to a surface of the welded workpiece W. When carbon dioxide alone or the gas mixture containing carbon dioxide as a main component is used as the shield gas, the arc is constricted by the thermal pinching effect. As illustrated in FIG. 4B, therefore, the arc generates from the lower end of the droplet. Hence, the size of the droplet increases to the wire diameter or more, namely, to be larger than that in the case of using the gas mixture of Ar-5 to 30% $CO_2$ as the shield gas (i.e., the MAG pulse welding). For that reason, in each pulse cycle, the arc length is changed in an amount corresponding to at least the droplet diameter upon the release of the droplet. However, such a phenomenon is not a phenomenon that balance between a wire feed speed and a melting rate is lost. In other words, the change of the arc length caused upon the release of the droplet does not reflect the result of unbalance between the wire feed speed and the melting rate.

Also, as a result of comparing the size of the droplet formed by the carbon-dioxide pulse arc welding in each pulse cycle, the droplet size is substantially the same in each pulse cycle. However, because the detailed shape of the droplet of course differs in each pulse cycle, the arc lengths measured in the first pulse periods of respective pulse cycles differ from one another, as illustrated in FIG. 4A, depending on, e.g., how each droplet is constricted, and how each droplet is deformed until the release. On the other hand, changes corresponding to the changes of the arc length do not appear in the welding voltage during the first pulse period, which is illustrated in FIG. 4A. This is related to the fact that, in a complex process of the release of the droplet having an increased diameter, the arc length is not always proportional to the welding voltage and an arc generated area (i.e., an anode area) on the wire side and the breadth of an arc column are also changed at the same time.

From the above-discussed studies, it is concluded that correlation between the arc length and the welding voltage in the first pulse period is low.

Figure 5:
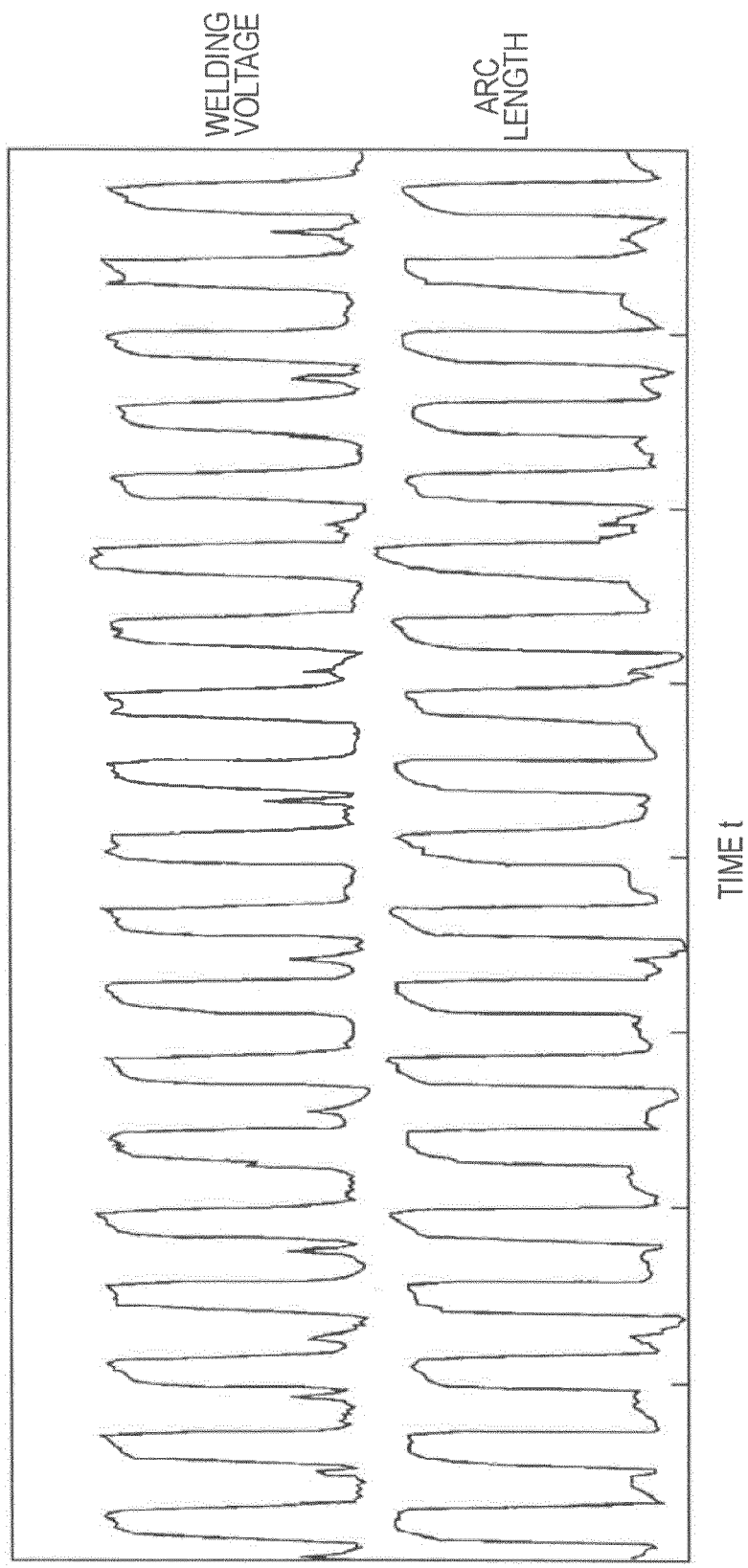
FIG. 5 is a graph representing one example of measurement results of the welding voltage and the arc length in known MAG pulse welding.

For the purpose of comparison, the MAG pulse welding using the different shield gas is discussed below. In the MAG pulse welding, because the arc generates from above the droplet and the droplet size is small, the change of the arc length caused by the release of the droplet is small. FIG. 5 illustrates a graph (i.e., results of measuring the arc length) plotting the arc length momentarily photographed in the MAG pulse welding in a similar manner, and the waveform of the welding voltage at the time of photographing. As apparently seen from FIG. 5, the arc length and the welding voltage are closely correlated with each other in the MAG pulse welding using the simple pulse waveform.

Figure 6:
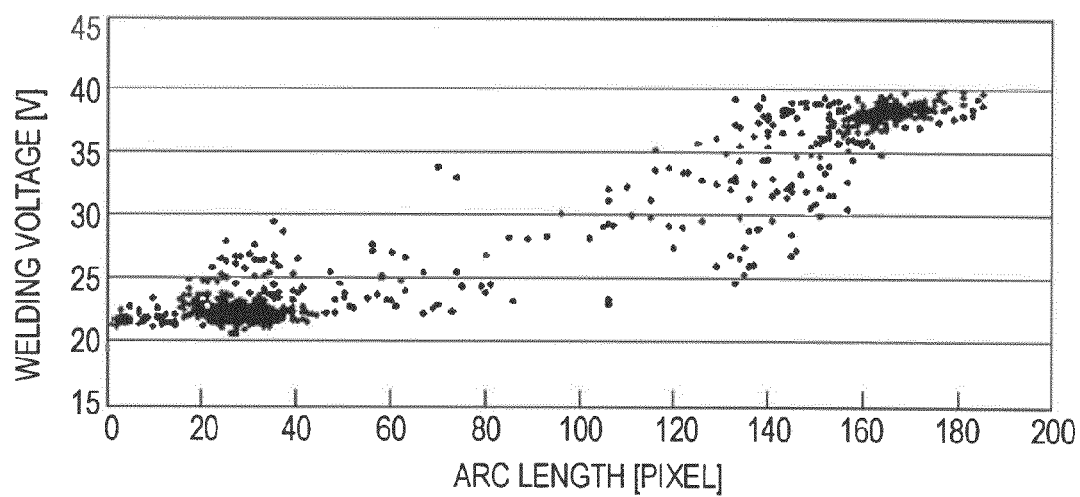
FIG. 6 is a graph representing the relationship between the welding voltage and the arc length in the known MAG pulse welding.

FIG. 6 is a graph obtained by re-plotting, on an XY plane, the momentary relationship between the arc length and the welding voltage, illustrated in FIG. 5, which have been measured in the MAG pulse welding. The horizontal axis of the graph of FIG. 6 represents the arc length, and the vertical axis represents the welding voltage. From plotted points (rhombic dots), a tendency of the welding voltage to increase with an increase of the arc length is apparently confirmed in the MAG pulse welding.

Figure 7:
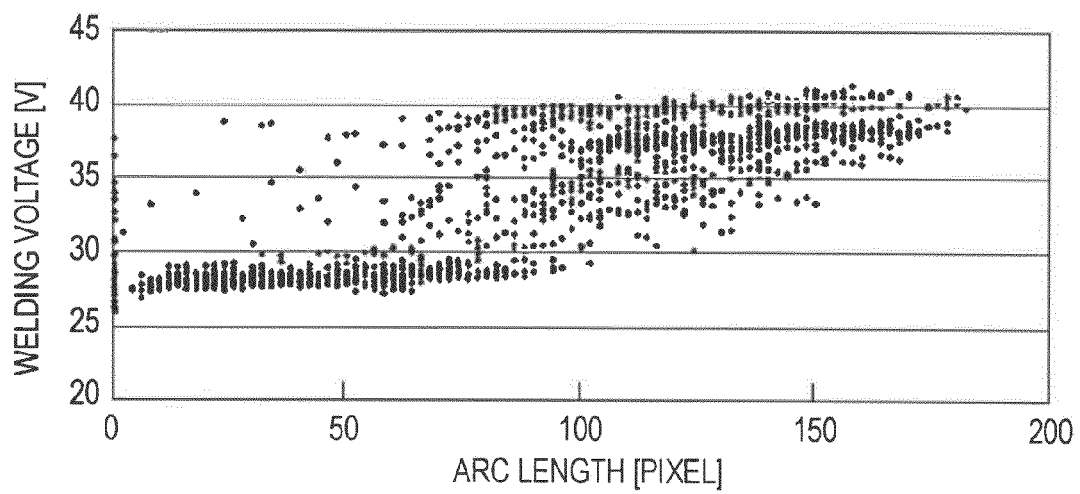
FIG. 7 is a graph representing the relationship between the welding voltage and the arc length in the known carbon-dioxide pulse welding.

Similarly, FIG. 7 is a graph obtained by re-plotting, on an XY plane, the momentary relationship between the arc length and the welding voltage, illustrated in FIG. 4A, which have been measured in the carbon-dioxide pulse arc welding. From plotted points (rhombic dots), a tendency of the welding voltage to increase with an increase of the arc length is confirmed, but a variation is very large. From the above-discussed studies, it is concluded that, since the arc length in the first pulse period is governed by droplet behaviors in processes of deformation and release of the droplet, using voltage information reflecting those factors in the arc length control reduces accuracy in adjusting balance between the feed speed of the molten wire and the melting rate thereof. On the other hand, it has been found that the correlation between the welding voltage and the arc length in the second pulse period is high. For that reason, the information obtained in the second pulse period is used in the above-mentioned formula (1).

[Configuration of Welding System]

Figure 8:
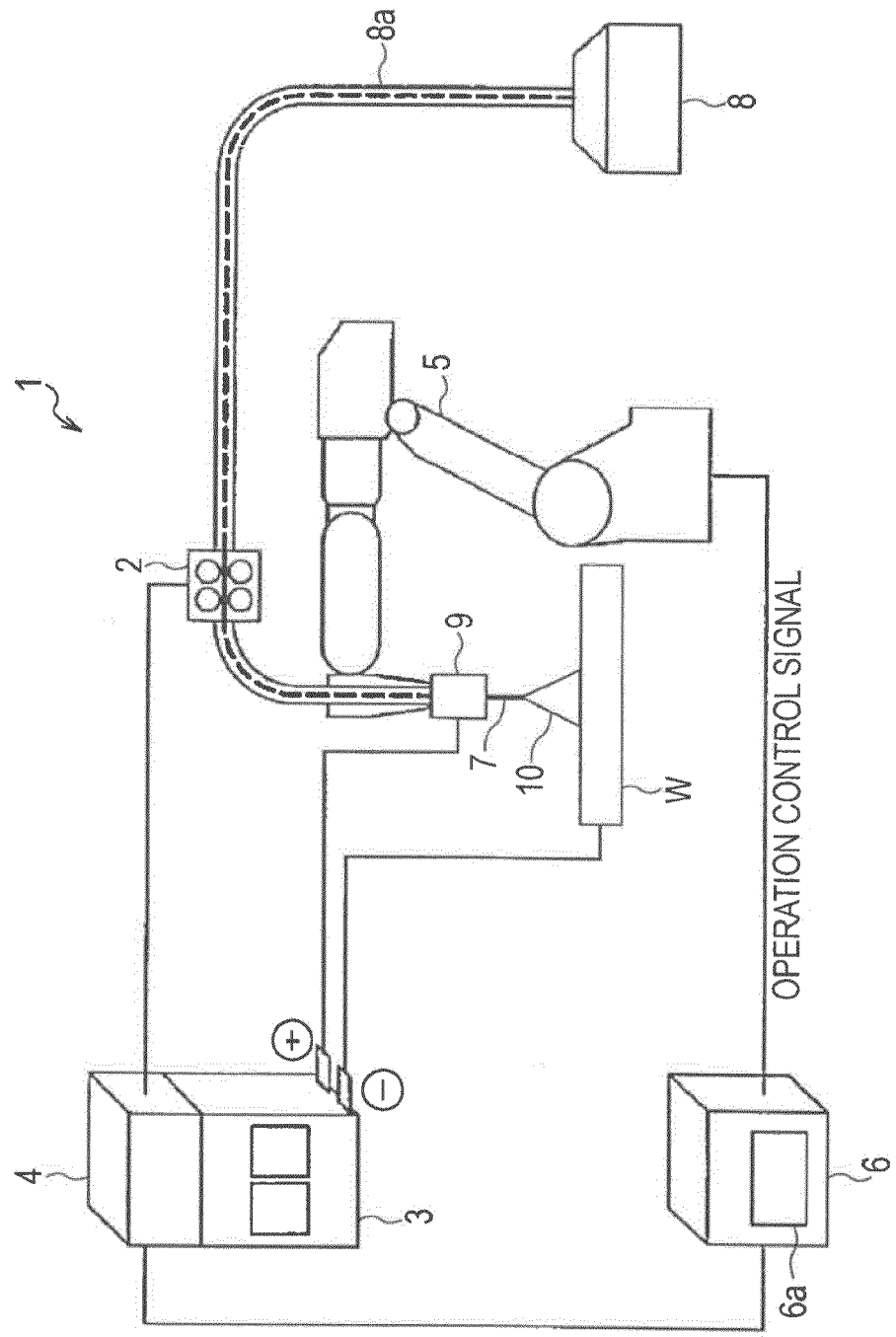
FIG. 8 illustrates one example of the configuration of a welding system including the welding control apparatus according to the present invention.

FIG. 8 illustrates one example of the configuration of a welding system including the welding control apparatus according to the present invention. A welding system 1 according to the embodiment of the present invention primarily includes, as illustrated in FIG. 8, a wire feeder 2, a welding power supply 3, a welding control apparatus 4, an arc welding robot 5, and a robot control apparatus 6.

The wire feeder 2 is connected to the welding power supply 3 through the welding control apparatus 4. The welding power supply 3 drives the wire feeder 2 including rollers to feed a wire 7, etc. When the welding control apparatus 4 outputs a welding command signal to the welding power supply 3, the wire feeder 2 is driven by the welding power supply 3, and the wire 7 is fed to the torch 9 from a wire storage container 8 through a wire feed path 8a. Details of the welding control apparatus 4 according to the embodiment of the present invention will be described later.

The arc welding robot 5 is, e.g., a 6-axis multi-articulated welding robot and includes the torch 9 mounted to the wrist of the robot. The arc welding robot 5 can move the torch 9 by moving various articulations with operations of motors (not shown), which are disposed inside the robot, based on a command from the robot control apparatus 6. The torch 9 feeds the wire toward the workpiece W to be welded. Welding is performed by the action of an arc 10 formed between the wire and the welded workpiece W.

The robot control apparatus 6 is connected to the arc welding robot 5 and includes a control panel 6a through which commands indicating a welding path and welding work conditions are input. The robot control apparatus 5 controls the arc welding robot 5 based on the input commands. In the embodiment, commands for the welding control apparatus 4 can also be input through the control panel 6a. When commands are input to the robot control apparatus 6, those commands may also be input, instead of the control panel 6a, through a teach pendant (not shown) which is connected to the robot control apparatus 6 by a cable, for example. As an alternative, it is also possible to previously store the welding path and the welding work conditions, which are instructed in the form of a predetermined teach program, in the robot control apparatus 6 and to control the arc welding robot 5, etc. based on the stared data.

Each of the welding control apparatus 4 and the robot control apparatus 6 includes, for example, a CPU (Central Processing Unit), a ROM (Read Only Memory), a RAM (Random Access Memory, an HDD (Hard Disk Drive), an input/output interface, etc.

Welding Control Apparatus

First Embodiment

Figure 9:
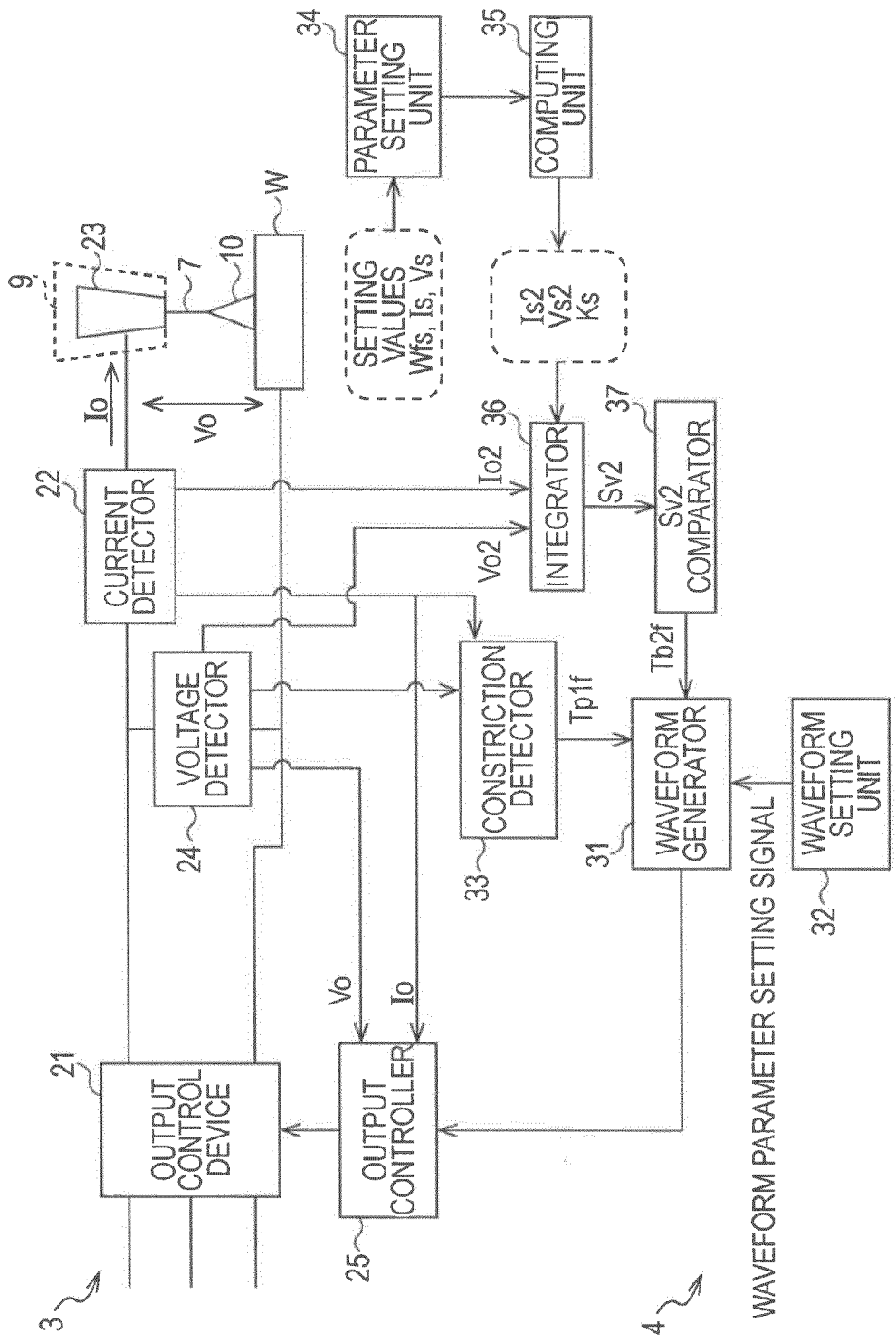
FIG. 9 is a block diagram illustrating the configuration of the welding control apparatus according to the present invention.

FIG. 9 is a block diagram illustrating the configuration of the welding control apparatus according to the present invention. FIG. 9 illustrates the welding control apparatus 4 and the welding power supply 3 for feeding the wire 7 to the torch 9 in accordance with a signal output from the welding control apparatus 4.

An output control device 21 is connected to a commercial power supply of 3-phase 200 V, for example, and a current applied to the output control device 21 passes through a transformer, a rectifier (diode), and a DC reactor, which are all not shown in the drawing, for application to a contact tip 23 through a current detector 22 for detecting the welding current. The contact tip 23 is contained in the torch 9 indicated by a dotted line.

The current detector 22 detects the instantaneous value Io of the welding current and outputs a detected current signal to an output controller 25. Further, the current detector 22 detects the instantaneous value Io2 of the welding current in the second pulse period and outputs a detected current signal to an integrator 36.

The welded workpiece W is connected to the lower-potential power supply side of the output control device 21 through a transformer (not shown) such that the arc 10 is generated between the wire 7, which is inserted through the contact tip 23 and is supplied with power, and the welded workpiece W.

The voltage detector 24 detects the instantaneous value Vo of the welding voltage between the contact tip 23 and the welded material W and outputs a detected voltage signal to the output controller 25. Further, the voltage detector 24 detects the instantaneous value Vo2 of the welding voltage in the second pulse period and outputs a detected voltage signal to the integrator 36.

The output controller 25 determines command values of the welding current and the welding voltage, both supplied to the wire 7, based on the detected signal (Io) of the welding current, which is input from the current detector 22, the detected signal (Vo) of the welding voltage, which is input from the voltage detector 24, and signals indicating respective waveforms of the first pulse 201 and the second pulse 202, which are input from the waveform generator 31. Further, the output controller 25 outputs a welding command signal to control the output control device 21, thereby controlling a welding output.

The waveform generator 31 alternately generates two types of pulse signals having different pulse waveforms, i.e., the first pulse 201 serving to release the droplet and the second pulse 202 serving to shape the droplet, and it outputs the generated pulse signals to the welding power supply 3 through the output control device 21. Various waveform parameters set by the waveform setting unit 32 are input to the waveform generator 31.

Further, when the constriction of the droplet is detected, the waveform generator 31 immediately changes over the current value of the first pulse 201 to the predetermined value lower than a current value at the time of detection of the constriction. In this embodiment, a first pulse period end signal (Tp1*f*) indicating a state just before the release of the droplet is input to the waveform generator 31 from the constriction detector 33. Upon the inputting of the first pulse period end signal (Tp1*f*), the waveform generator 31 makes a shift to the first pulse base period. In the first pulse base period, a signal for correcting the output of the output controller 25 (i.e., an output correction signal) is output to the output controller 25 based on the setting value preset in the waveform setting unit 32 so that the first pulse base current is provided. After the end of the first pulse base period, the waveform generator 31 outputs a second pulse waveform signal so as to provide the pulse waveform preset in the waveform setting unit 32. Subsequently, the waveform generator 31 repeats the alternate outputting of the first pulse and the second pulse. A length Tb1 of the first pulse base period is assumed to be a constant value corresponding to the setting value Is of the welding current.

A second base period end signal (Tb2*f*) indicating that the calculation result based on the above-mentioned formula (1) has become equal to 0 is also input to the waveform generator 31 from the Sv2 comparator 37. When the second base period end signal (Tb2*f*) is input in each pulse cycle, the waveform generator 31 terminates the relevant pulse cycle and starts the next pulse cycle.

The waveform setting unit 32 sets, in the waveform generator 31, waveform parameters (such as the peak current, the pulse peak period, the base current, the pulse base period, the rising slope period, and the falling slope period) for each of the first pulse 201 and the second pulse 202. In this embodiment, the waveform setting unit 32 inputs various values of the waveform parameters, which are previously stored in storage means (not shown), as waveform parameter setting signals in the waveform generator 31.

The constriction detector 33 detects the constriction 306 of the droplet, i.e., the state just before the release of the droplet, based on at least one of the welding current detected by the current detector 22 and the welding voltage detected by the voltage detector 24. The constriction detector 33 can detect the constriction of the droplet by using a first- or second-order time differential signal for, e.g., the welding voltage or arc impedance. In this embodiment, the constriction detector 33 is assumed to detect the constriction of the droplet based on a second-order time differential value resulting from the instantaneous value Vo of the welding voltage detected by the voltage detector 24.

Figure 10:
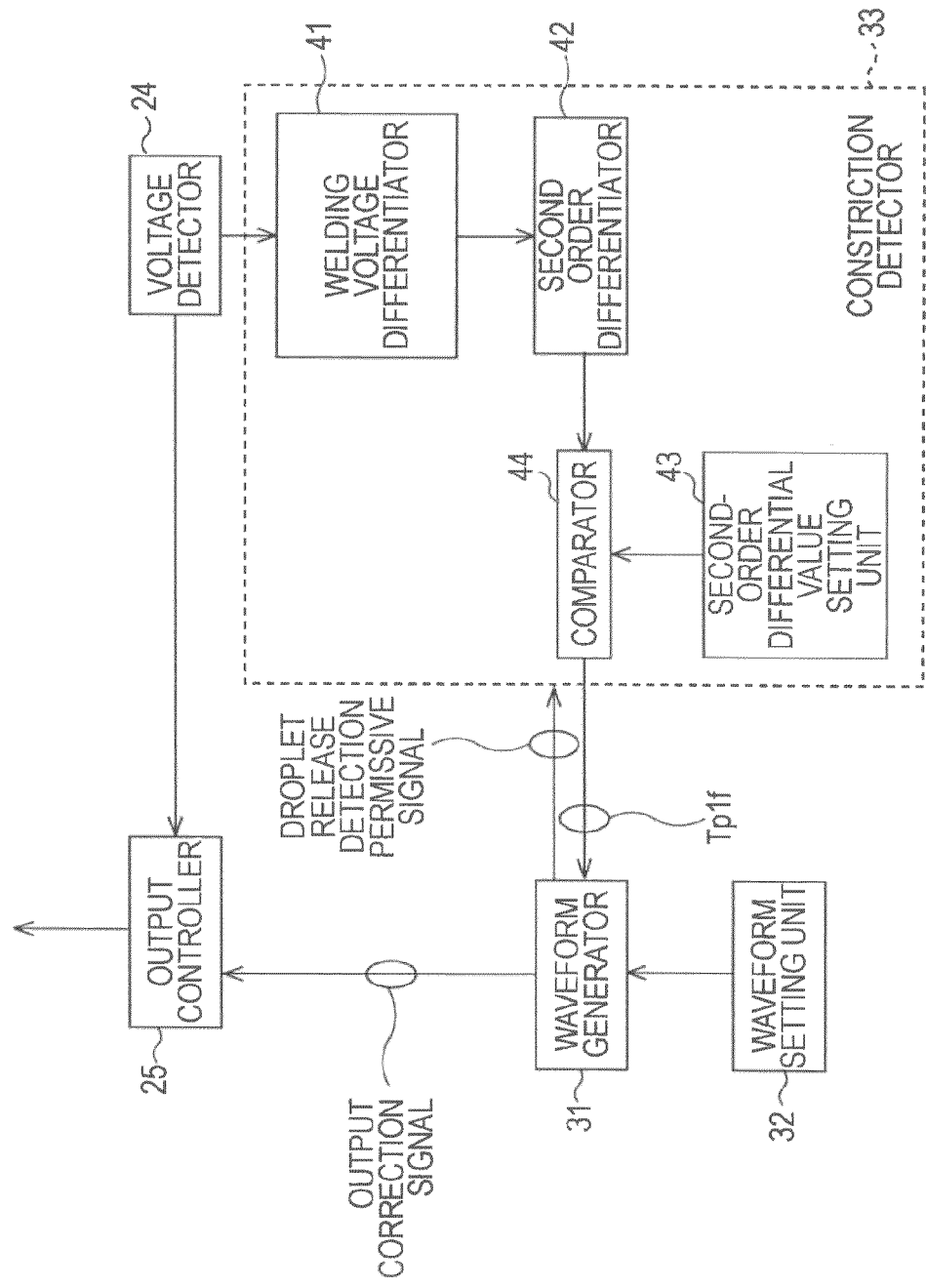
FIG. 10 is a block diagram illustrating one example of the configuration of a constriction detector in FIG. 9.

In this embodiment, the constriction detector 33 includes, as illustrated in FIG. 10, a welding voltage differentiator 41, a second order differentiator 42, a second-order differential value setting unit 43, and a comparator 44. Those components execute respective processes when a droplet release detection permissive signal is being input from the waveform generator 31.

The welding voltage differentiator 41 executes time differentiation of the instantaneous value Vo of the welding voltage detected by the voltage detector 24. A resulting time differential voltage value dV/dt is further subjected to time differentiation by the second order differentiator 42, and a calculation result, i.e., a second-order time differential value $d^2V/dt^2$, is input to the comparator 44. The second-order differential value setting unit 43 sets, as a second-order time differential value, a threshold corresponding to the second-order time differential value of the welding voltage, which represents the constriction just before the release of the droplet from the wire distal end.

The comparator 44 compares the second-order time differential value resulting from the instantaneous value Vo of the welding voltage during the welding (called a second-order differentiation detected value), which is input from the second order differentiator 42, with the second-order time differential value set by the second-order differential value setting unit 43 (called a second-order differentiation setting value). When the second-order differentiation detected value is equal to or larger than the second-order differentiation setting value, the comparator 44 determines that the droplet is in the state just before separating from the wire distal end, and then outputs the first pulse period end signal (Tp1f) to the waveform generator 31. Such a determination is based on capturing a phenomenon that the welding voltage and the resistance increase as the root of the droplet present at the wire distal end starts to constrict and the constriction progresses. By detecting the increase of the welding voltage and the resistance with the use of the second-order time differential value, etc., the constriction of the droplet can be precisely detected without being affected by changes of the welding conditions during the welding.

Returning to FIG. 9, the description of the welding control apparatus 4 is further continued.

A parameter setting unit 34 sets the wire feed speed wfs, the welding current setting value Is, the welding voltage setting value Vs, etc. in a computing unit 35. In this embodiment, the parameter setting unit 34 inputs various values of welding parameters, which are previously stored in the storage means (not shown), as setting parameter signals (e.g., a welding current value setting signal and a welding voltage value setting signal) to the computing unit 35.

The computing unit 35 calculates various parameters based on the setting values that have been set in advance, and then inputs the calculated various parameters to the integrator 36. More specifically, the computing unit 35 uniquely determines the gradient Ks of the external characteristic of the welding power supply 3 depending on the input various setting values. The gradient Ks of the external characteristic is properly set depending on the welding current setting value Is (or the welding voltage setting value Vs), the wire feed speed Wfs, the wire type, the composition of the shield gas, etc. The computing unit 35 determines the gradient Ks of the external characteristic by using, e.g., a table or a function for conversion.

Further, the computing unit 35 uniquely determines the welding current setting value Is2 in the second pulse period depending on a value Is of the welding current value setting signal, which has been input, by using, e.g., a table or a function for conversion. For example, the computing unit 35 determines the welding current setting value Is2 in the second pulse period by using a table or a function for conversion.

In addition, the computing unit 35 uniquely determines the welding voltage setting value Vs2 in the second pulse period depending on a value Vs of the welding voltage value setting signal and the value Is of the welding current value setting signal, which have been both input. In this embodiment, the computing unit 35 determines the welding voltage setting value Vs2 in the second pulse period through calculation based on the following formula (4):

$$Vs2 = Vs2\_ini = Vs2\_chg(Vs - Vs\_ini) \qquad (4)$$

In the formula (4), Vs_ini is a specific central voltage determined depending on the welding current setting value Is, Vs2_ini is a specific central voltage in the second pulse period, which is determined depending on the welding current setting value Is2 in the second pulse period, and Vs2_chg is a change amount of the welding voltage setting value Vs2 in the second pulse period when the value (Vs) of the welding voltage value setting signal is changed by 1 [V]. The term "specific central voltage" means an optimum arc voltage corresponding to the set Is under the standard condition of electrode extension, and it is set to a value that has been obtained in advance with experiments.

The integrator 36 executes the calculation expressed by the above-mentioned formula (1) by using the gradient Ks of the external characteristic and the welding current setting value Is2 and the welding voltage setting value Vs2 in the second pulse period, which are input from the computing unit 35, as well as the welding current detected signal (Io) input from the current detector 22 and the welding voltage detected signal (Vo) input from the voltage detector 24, and then outputs an integral value signal (Sv2), indicating the result of calculating a voltage error integral value, to the Sv2 comparator 37. The timing at which the integrator 36 starts the calculation of the formula (1) is a start time of the second pulse period in the pulse cycle. The integrator 36 brings the calculation to an end at a time when the calculation result of the voltage error integral value Sv2, expressed by the formula (1), has become 0.

The Sv2 comparator 37 executes comparison to determine whether the input integral value signal (Sv2) has become equal to 0. At a time when the determination of Sv2=0 is obtained, the Sv2 comparator 37 outputs the second base period end signal (Tb2f) to the waveform generator 31. Upon the inputting of the second base period end signal (Tb2f), the waveform generator 31 terminates the relevant pulse cycle and starts the next pulse cycle. Repeating the above-described steps for each pulse cycle, the operating point can be held on the line corresponding to the gradient Ks of the external characteristic, and the arc length control can be realized in such a way that the arc length is adjusted in units of one pulse cycle (one droplet).

According to the first embodiment, because of using the instantaneous value Io2 of the welding current and the instantaneous value Vo2 of the welding voltage in the second pulse period, which have higher correlation with respect to the actual arc length, a variation in the arc length caused by disturbances can be more precisely suppressed than the known arc length control using the welding current value and the welding voltage value which are detected over the entire pulse cycle.

Second Embodiment

In a welding control apparatus according to a second embodiment, a process of suppressing an influence resulting from a change of the base period Tb2 of the second pulse period by changing the peak period Tp2 of the second pulse period is added as an auxiliary process while executing, as a main process, the above-described arc length control utilizing a change of pulse frequency (i.e., a change of the base period Tb2 of the second pulse period). Therefore, the same components as those in the welding control apparatus 4 according to the first embodiment are denoted by the same reference numerals, and a description of those components is omitted. The welding control apparatus according to the second embodiment will be described below with reference to FIG. 9.

The waveform generator 31 generates the second pulse waveform through the step of calculating, based on the following formula (2), an addition/reduction value $\Delta Tp2(n)$ for increasing or decreasing the value of the peak period of the second pulse period, which is one of the preset waveform parameters, with respect to the setting value Tp2 thereof:

$$\Delta Tp2(n) = Kstp\{Tb2\text{ref} - Tb2(n-1)\} \quad (2)$$

Among parameters in the formula (2), $Tb2(n-1)$ is an actually measured value of the base period of the second pulse period in the preceding (n−1)-th pulse cycle. Further, Tb2ref is a reference value of the base period of the second pulse period, and Kstp is a change gain for the peak period of the second pulse period.

The waveform setting unit 32 sets, in addition to the waveform parameters, the reference value Tb2ref of the base period of the second pulse period and the change gain Kstp for the peak period of the second pulse period in the waveform generator 31. Those parameters are determined depending on the wire feed speed, the tip-to-base material distance, the wire type, the gas composition, etc.

The waveform generator 31 executes the calculation based on the formula (2), corrects the peak period of the second pulse period in the n-th pulse cycle by increasing or decreasing it by $\Delta Tp2(n)$ with respect to the setting value Tp2 thereof, and outputs the corrected waveform parameter to the output controller 25.

According to the second embodiment, the influence caused by changing the base period Tb2 of the second pulse period in the preceding pulse cycle can be compensated for by increasing or decreasing the peak period Tp2 in the present pulse cycle and providing an integral value, which is obtained by calculating the peak current value Ip2 for a peak period $\Delta Tp2(n)$ corresponding to the increase or decrease of the peak period Tp2. For example, when the base period Tb2 is shortened in the preceding pulse cycle, the influence of the frequency change in the second pulse period or over the entire pulse cycle can be lessened by lengthening the peak period Tp2 in the present pulse cycle. Therefore, generation of spatters can be suppressed without impairing the regularity of the droplet transfer even when the tip-to-base material distance is momentarily changed with weaving of the tip within the gap (grove).

Modification of Second Embodiment

In a modification of the second embodiment, an upper limit value and a lower limit value are previously set for the addition/reduction value $\Delta Tp2(n)$ that is calculated by the waveform generator 31 based on the above-mentioned formula (2). More specifically, the waveform setting unit 32 additionally sets a maximum value of an increase range and a maximum value of a decrease range for the addition/reduction value $\Delta Tp2(n)$ in the waveform generator 31. The maximum value of the increase range and the maximum value of the decrease range for the addition/reduction value $\Delta Tp2(n)$ are set in advance so that the value of the peak period of the second pulse period is held at a proper value. The proper value of the peak period of the second pulse period can be set by previously obtaining such a range of the peak period value as not disturbing the regularity of the droplet transfer with experiments, for example, and by selecting a value within the obtained range as the proper value.

The waveform generator 31 compares the maximum value of the increase range and the maximum value of the decrease range for the addition/reduction value $\Delta Tp2(n)$ with the calculated result of the addition/reduction value $\Delta Tp2(n)$. If an absolute value of the calculated result exceeds the maximum value of the increase range or the maximum value of the decrease range, the waveform generator 31 generates the second pulse waveform by setting the addition/reduction value $\Delta Tp2(n)$, by which the value of the peak period of the second pulse period is increased or decreased with respect to the setting value Tp2, to the maximum value of the increase range or the maximum value of the decrease range.

Thus, by previously setting the upper limit value and the lower limit value for the addition/reduction value $\Delta Tp2(n)$, it is ensured that the peak period Tp2 of the second pulse period is not excessively changed. It is hence possible to eliminate an adverse influence that the regularity of the droplet transfer is disturbed by an excessive change of the peak period Tp2 of the second pulse period.

Third Embodiment

A welding control apparatus according to a third embodiment differs from the welding control apparatus according to the second embodiment in that the auxiliary process of suppressing an influence resulting from a change of the base period Tb2 of the second pulse period, which is generated in the main process of the arc length control, is realized by changing the peak current value Ip2 in the second pulse period. Therefore, the same components as those in the welding control apparatus 4 according to the first embodiment are denoted by the same reference numerals, and a description of those components is omitted. The welding control apparatus according to the third embodiment will be described below with reference to FIG. 9.

The waveform generator 31 generates the second pulse waveform through the step of calculating, based on the following formula (3), an addition/reduction value $\Delta Ip2(n)$ for increasing or decreasing the value of the peak current in the second pulse period, which is one of the preset waveform parameters, with respect to the setting value Ip2 thereof:

$$\Delta Ip2(n) = Ksip\{Tb2\text{ref} - Tb2(n-1)\} \quad (3)$$

Among parameters in the formula (3), $Tb2(n-1)$ is an actually measured value of the base period of the second pulse period in the preceding (n−1)-th pulse cycle. Further, Tb2ref is a reference value of the base period of the second pulse period, and Ksip is a change gain for the peak current in the second pulse period.

The waveform setting unit 32 sets, in addition to the waveform parameters, the reference value Tb2ref of the base period of the second pulse period and the change gain Ksip for the peak current in the second pulse period in the waveform generator 31. Those parameters are determined depending on the wire feed speed, the tip-to-base material distance, the wire type, the gas composition, etc.

The waveform generator 31 executes the calculation based on the formula (3), corrects the peak current in the second pulse period in the n-th pulse cycle by increasing or decreasing it by $\Delta Ip2(n)$ with respect to the setting value Ip2 thereof, and outputs the corrected waveform parameter to the output controller 25.

According to the third embodiment, the influence caused by changing the base period Tb2 of the second pulse period in the preceding pulse cycle can be compensated for by increasing or decreasing the peak current value Ip2 in the present pulse cycle and providing an integral value, which is obtained by calculating the peak current value $\Delta Ip2(n)$ corresponding to the increase or decrease of the peak current value Ip2 for the peak period Tp2. For example, when the base period Tb2 is shortened in the preceding pulse cycle, the influence of the frequency change in the second pulse period or over the entire pulse cycle can be lessened by increasing the peak current value Ip2 in the present pulse cycle. Therefore, generation of spatters can be suppressed without impairing the regularity of the droplet transfer even when the tip-to-base material distance is momentarily changed with weaving of the tip within the gap (grove).

Modification of Third Embodiment

In a modification of the third embodiment, an upper limit value and a lower limit value are previously set for the addition/reduction value $\Delta Ip2(n)$ that is calculated by the waveform generator 31 based on the above-mentioned formula (3). More specifically, the waveform setting unit 32 additionally sets a maximum value of an increase range and a maximum value of a decrease range for the addition/reduction value $\Delta Ip2(n)$ in the waveform generator 31. The maximum value of the increase range and the maximum value of the decrease range for the addition/reduction value $\Delta Ip2(n)$ are set in advance so that the value of the peak current in the second pulse period is held at a proper value. The proper value of the peak current in the second pulse period can be set by previously obtaining such a range of the peak current value as not disturbing the regularity of the droplet transfer with experiments, for example, and by selecting a value within the obtained range as the proper value.

The waveform generator 31 compares the maximum value of the increase range and the maximum value of the decrease range for the addition/reduction value $\Delta Ip2(n)$ with the calculated result of the addition/reduction value $\Delta Ip2(n)$. If an absolute value of the calculated result exceeds the maximum value of the increase range or the maximum value of the decrease range, the waveform generator 31 generates the second pulse waveform by setting the addition/reduction value $\Delta Ip2(n)$, by which the value of the peak current in the second pulse period is increased or decreased with respect to the setting value Ip2, to the maximum value of the increase range or the maximum value of the decrease range.

Thus, by previously setting the upper limit value and the lower limit value for the addition/reduction value $\Delta Ip2(n)$, it is ensured that the peak current value Ip2 in the second pulse period is not excessively changed. It is hence possible to eliminate an adverse influence that the regularity of the droplet transfer is disturbed by an excessive change of the peak current value Ip2 in the second pulse period.

[Practical Advantages of Arc Length Control Method]
<First Practical Advantage>

Figure 11:
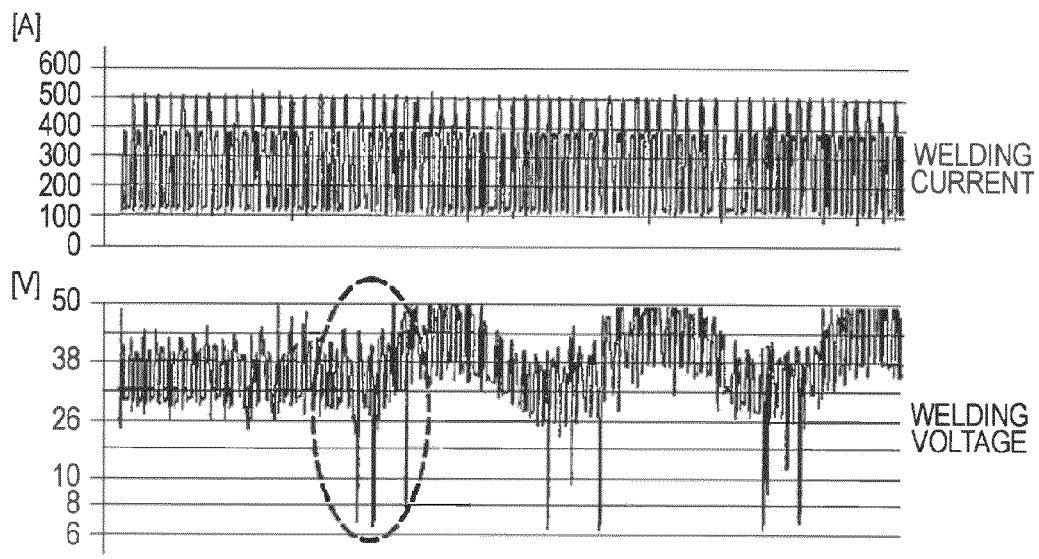
FIG. 11 illustrates graphs representing respectively a welding current and a welding voltage in the known carbon-dioxide pulse welding (reference example)
Figure 12:
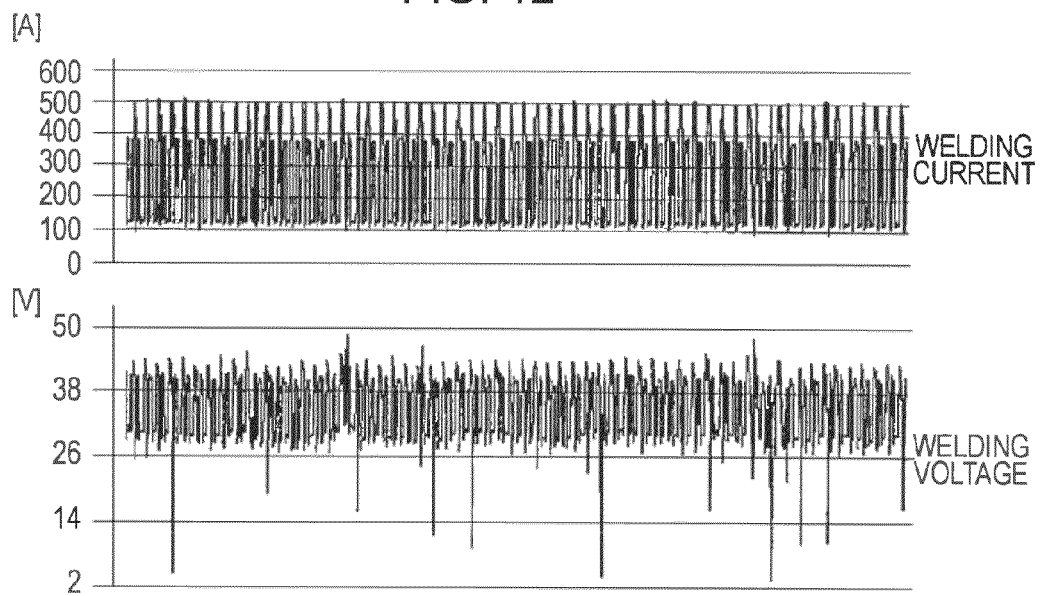
FIG. 12 illustrates graphs representing respectively a welding current and a welding voltage in carbon-dioxide pulse welding using an arc length control method according to the present invention.

The practical advantage of the arc length control method according to each embodiment will be described with reference to FIGS. 11 and 12 in comparison with the related art, i.e., the pulse arc welding process using the above-described formula (102). FIG. 11 illustrates graphs (timing charts) representing respectively detected values of a welding current and a welding voltage in the related art, and FIG. 12 illustrates graphs (timing charts) representing respectively detected values of the welding current and the welding voltage in the arc length control method according to the first embodiment. Each graph represents waveforms in about 60 pulse cycles.

As described above regarding the principle of the arc length control, it is concluded that the correlation between the arc length and the welding voltage over the entire region of each pulse cycle is low in the carbon-dioxide pulse arc welding process.

Accordingly, satisfactory accuracy cannot be obtained with the known arc length control using the voltage error integral value Svb expressed by the above-mentioned formula (102). When the arc length control is performed using the voltage error integral value Svb expressed by the above-mentioned formula (102), an oscillation of the arc length may be induced in some cases even when the wire feed speed and the melting rate are each held substantially the same. The graph of FIG. 11 suggests the possibility of such a phenomenon.

Comparing FIGS. 11 and 12 with each other, waveforms of the welding currents are similar, but waveforms of the welding voltages differ to a large extent. A time region indicated by a broken-line ellipse in FIG. 11 includes cycles where the value of the welding voltage abruptly reduces. Such a phenomenon is included in other time regions of the graph of FIG. 11 and in the graph of FIG. 12 as well. In other words, such a phenomenon represents the occurrence of a short-circuiting between the droplet and the pool of molten metal in the droplet release process in the first pulse period. After the time region indicated by the broken-line ellipse in FIG. 11, the welding voltage diverges without converging within a certain range. Thus, the arc length oscillates and the welding becomes unstable. As a result, the effect of reducing spatters is lost which is intentionally expected by using two types of different waveforms.

In contrast, with the arc length control according to the first embodiment using the voltage error integral value Sv2 expressed by the above-mentioned formula (1), even when a short-circuiting occurs, the welding voltage converges within a certain range without diverging, as seen from FIG. 12. This is because the formula (1) employs, unlike the formula (102), the instantaneous value Io2 of the welding current and the instantaneous value Vo2 of the welding voltage in the second pulse period, which have relatively high correlation with respect to the actual arc length, without using the instantaneous values of the welding current and the welding voltage in the first pulse period, which are greatly affected by the droplet behaviors. Accordingly, the arc length control according to the first embodiment can realize the arc length control with higher accuracy than the case of using data over the entire region of each pulse cycle as in the related art.

<Second Practical Advantage>

Figure 13:
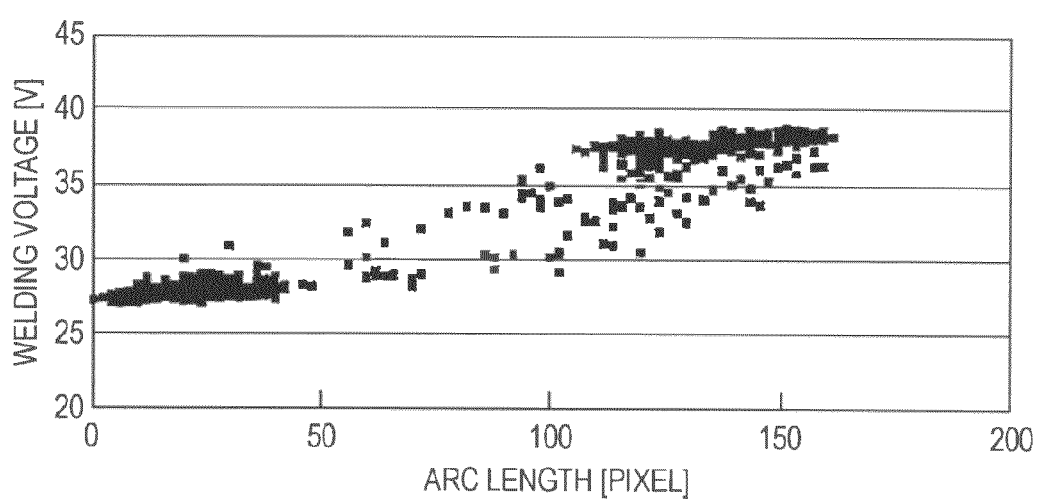
FIG. 13 is a graph representing the relationship between the welding voltage and the arc length in the carbon-dioxide pulse welding according to the present invention.

FIG. 13 is a graph obtained by re-plotting, on an XY plane, the momentary relationship between the arc length and the welding voltage, which have been measured in the arc length control according to the first embodiment. The horizontal axis of the graph of FIG. 13 represents the arc length, and the vertical axis represents the welding voltage. Comparing the graph of FIG. 13 and the graph of FIG. 7 which represents the related art using the above-mentioned formula (102), it is apparently confirmed from plotted points (rhombic dots) that the tendency of the welding voltage to increase with an increase of the arc length is more noticeable in the graph of FIG. 13. Stated another way, it is understood that a variation in the first embodiment is smaller than that in the related art and the correlation between the arc length and the welding voltage in the second pulse period is relatively high. Thus, with the arc length control according to the first embodiment, a loss of the balance between the wire feed speed and the melting rate can be more precisely extracted without being affected by changes of the arc length, which are attributable to the droplet behaviors during the first pulse period.

<Third Practical Advantage>

Figure 14:
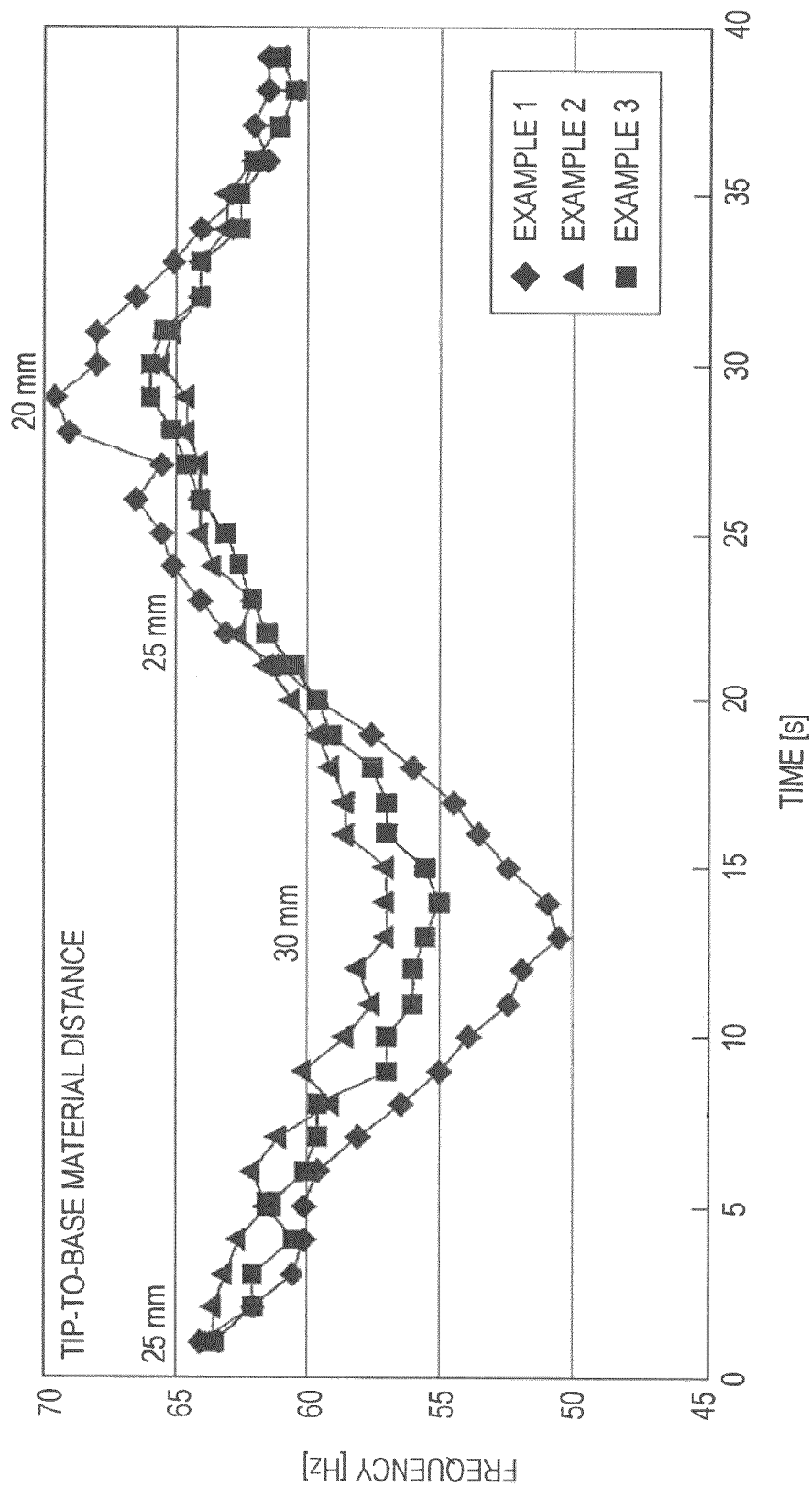
FIG. 14 is a graph representing changes of frequency in the present invention when the tip-to-base material distance is changed during the welding.
Figure 15:
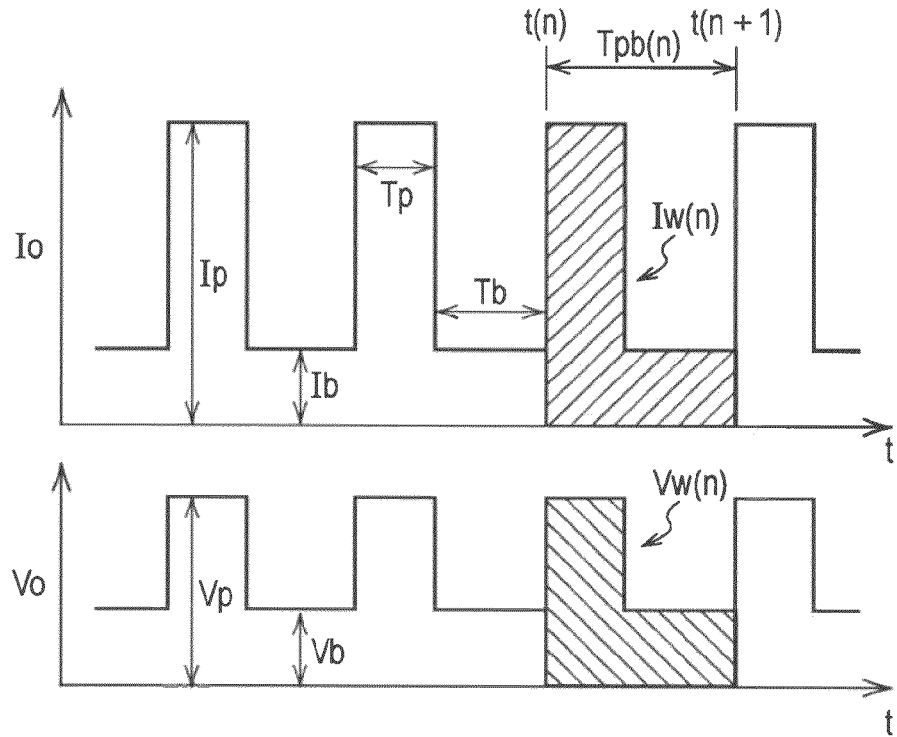
FIG. 15 is a timing chart illustrating one example of a pulse waveform used in known MAG pulse welding.
Figure 16:
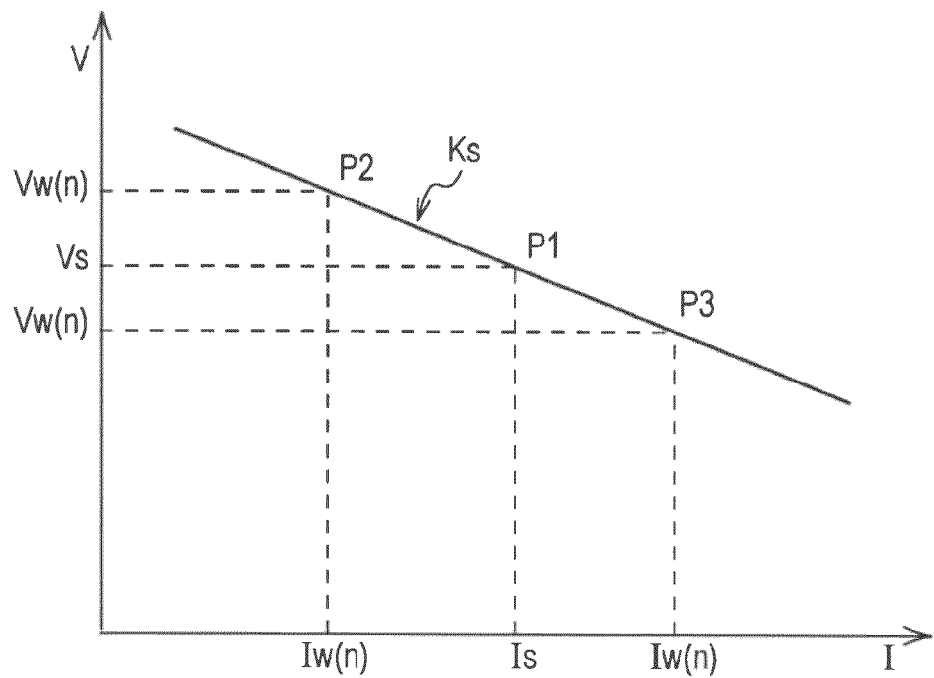
FIG. 16 is a graph representing the relationship between an operating point for the welding current and the welding voltage and a set gradient of an external characteristic, which is required to realize arc length control in the known MAG pulse welding.
Figure 17:
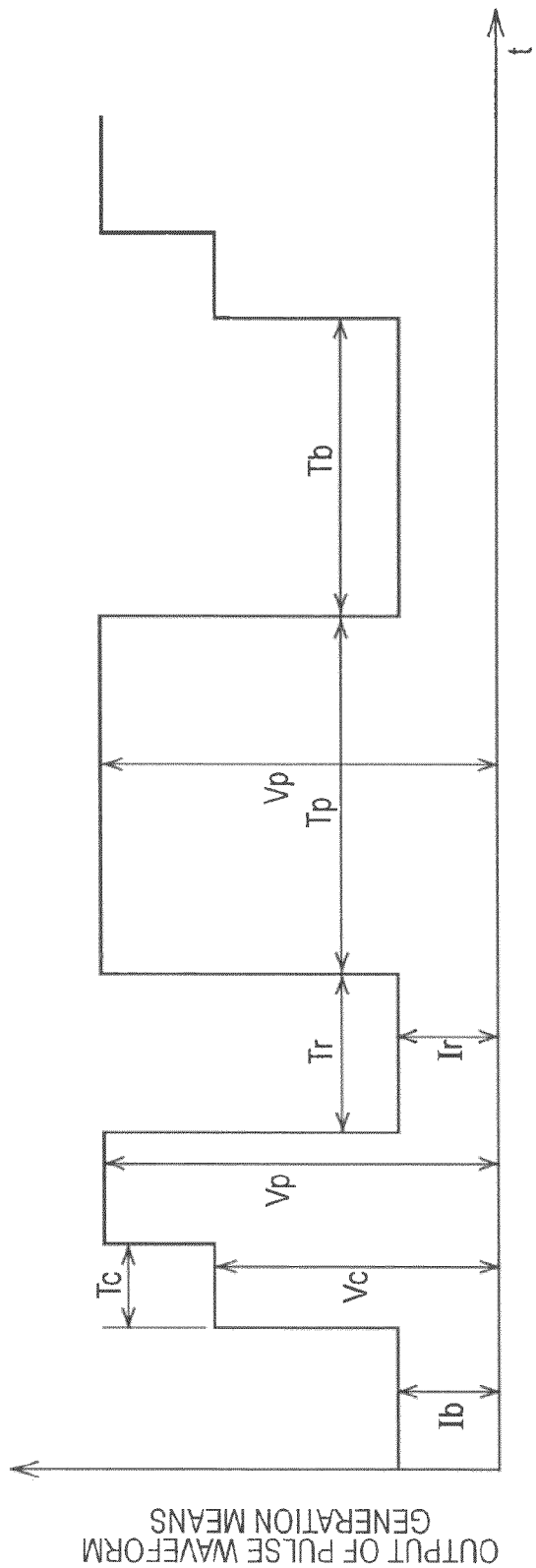
FIG. 17 is a timing chart illustrating one example of a pulse waveform used in a known pulse arc welding machine of consumed electrode type.

FIG. 14 is a graph representing changes of frequency when the tip-to-base material distance is changed during the welding in the arc length control method according to each of the above-described embodiments. The horizontal axis of the graph of FIG. 14 represents time [s], and the vertical axis represents frequency [Hz].

"Example 1" indicates the measurement results, represented by rhombic points, when the arc length control method according to the first embodiment is used.

"Example 2" indicates the measurement results, represented by triangular points, when the arc length control method according to the modification of the second embodiment is used.

"Example 3" indicates the measurement results, represented by square points, when the arc length control method according to the modification of the third embodiment is used.

The welding conditions employed in those measurements are as per "Welding Conditions 1" given below:

(Welding Conditions 1)
Wire feed speed: 14 [m/min]
Welding speed: 30 [m/min]
Shield gas: 100% of $CO_2$ $Ks$: −3.0 V/100 A (=−0.030 [V/A])

Also, in Example 2, the change gain Kstp, expressed by the above-mentioned formula (2), for the peak period of the second pulse period and the upper and lower limit values of the change gain are as follows:

$Kstp$: −0.5 [ms] (−2.5 [ms]≤$\Delta Tp2(n)$≤2.5 [ms])

Further, in Example 3, the change gain Ksip, expressed by the above-mentioned formula (3), for the peak current in the second pulse period and the upper and lower limit values of the change gain are as follows:

$Ksip$: −15 [A/ms] (−50 [A]≤$\Delta Ip2(n)$≤50 [A])

The graph of FIG. 14 is obtained on an assumption that the time of a certain initial state is 1 [s] and the tip-to-base material distance (i.e., the distance between the contact tip 23 and the welded workpiece W) is changed in order of 25 mm, 30 mm, 25 mm, 20 mm, and 25 mm during the welding until 39 [s].

As seen from FIG. 14 illustrating the measurement results of Examples 1 to 3, when the tip-to-base material distance is changed from 25 mm to 30 mm, for example, the base period Tb2 in the second pulse period is lengthened with the arc length control, and hence the frequency becomes lower. On the other hand, when the tip-to-base material distance is changed from 25 mm to 20 mm, the base period Tb2 in the second pulse period is shortened with the arc length control, and hence the frequency becomes higher.

Comparing the measurement results of Examples 1 to 3, Examples 2 and 3 provide smaller frequency changes and more satisfactory results than Example 1 when the tip-to-base material distance is changed. The reason is that, in Examples 2 and 3, the peak period Tp2 and the peak current value Ip2 in the second pulse period are changed within the range where the regularity of the droplet transfer is not impaired, while ensuring the least necessary period as the base period Tb2 of the second pulse period. Thus, Examples 2 and 3 can suppress the generation of spatters to a larger extent.

While the preferred embodiments of the present invention have been described above, the welding control apparatus and the arc length control method according to the present invention are not limited to the above-described embodiments. For example, while one fixed value is employed as the gradient Ks of the external characteristic in each of the above-described embodiments, the following modification is also practicable with respect to the gradient Ks of the external characteristic.

(Modification of KS)

In the welding control apparatus and the arc length control method according to the present invention, the calculation based on the above-mentioned formula (1) may be executed through the steps of additionally detecting a welding current mean value and a welding voltage mean value during the welding over the pulse cycle or the second pulse period, calculating respective deviations of those mean values from the welding current setting value Is and the welding voltage setting value Vs, and increasing the gradient of the external characteristic to be larger than the set gradient Ks of the external characteristic if at least one of the deviations is equal to or larger than a preset reference value.

While the welding system 1 according to the embodiment of the present invention has been described above as including the arc welding robot 5, the welding system can also be realized with, e.g., a semiautomatic torch, which needs manual operations, by using the welding control apparatus 4 and the welding power supply 3 according to the embodiment of the present invention.

Further, the welding system according to the present invention may be constituted by incorporating the welding control apparatus according to the present invention in the welding power supply 3.

In the present invention, the shield gas used in the pulse arc welding is not limited to 100% of $CO_2$, and it may be a gas mixture containing carbon dioxide (gas) as a main component (not less than 50%). Further, the gas mixture may contain inert gas, such as Ar.

While in each of the embodiments of the present invention, the first pulse 201 and the second pulse 202 have been described above as having different peak currents, the first pulse 201 and the second pulse 202 may differ in the pulse width from each other. Alternatively, those pulses may differ in both the peak current and the pulse width. In other words, the two types of pulses are just required to have different waveforms depending on their roles, i.e., the role of releasing the droplet and the role of shaping the droplet.

In addition, the welding control apparatus according to the present invention can also be realized by operating a general computer in accordance with a welding control program that causes the computer to execute the respective functions of the computing unit 35, the integrator 36, the Sv2 comparator 37, the waveform generator 31, and the constriction detector 33. The welding control program can be provided via a communication line, or can be distributed in the form written on a recording medium, such as a CD-ROM or a flash memory.

What is claimed is:

1. A welding control apparatus for use in pulse arc welding of consumed electrode type using, as shield gas, carbon dioxide or a gas mixture containing carbon dioxide as a main component, the welding control apparatus comprising:
   a current detector for detecting a welding current of a welding power supply;
   a voltage detector for detecting a welding voltage of the welding power supply;
   a constriction detector for detecting a constriction of a droplet of molten metal based on at least one of the detected welding current and welding voltage;
   a waveform generator for, during one pulse cycle made up of a first pulse period including a peak period and a base period of a first pulse waveform and a second pulse period including a peak period and a base period of a second pulse waveform, alternately generating two types of pulse waveforms differing in at least one of a pulse peak current and a pulse width to be output to the welding power supply based on preset waveform parameters such that the first pulse waveform for releasing the droplet from a wire distal end and the second pulse waveform for shaping the droplet are output as the two types of pulse waveforms in order named for transfer of one droplet, the waveform generator immediately changing over, when the constriction of the droplet is detected, a current value of a first pulse to a predetermined value lower than a current value at the time of detection of the constriction;
   an integrator for receiving, as parameters in a formula (1), inputs of preset various data of information regarding a gradient Ks of an external characteristic of the welding power supply, a welding current setting value Is2 in the second pulse period, and a welding voltage setting value Vs2 in the second pulse period, and further receiving inputs of various data of information regarding an instantaneous value Io2 of the welding current detected in the second pulse period and an instantaneous value Vo2 of the welding voltage detected in the second pulse period, the integrator starting calculation of a voltage error integral value Sv2 expressed by the formula (1) from a time when the first pulse period ends and the second pulse period starts in the pulse cycle and bringing the calculation to an end at a time when a result of the calculation has become 0; and
   a comparator for comparatively determining whether a value of the voltage error integral value Sv2 provided as the calculation result has become 0,
   wherein, for each pulse cycle, the waveform generator terminates a relevant pulse cycle and starts a next pulse cycle at a time when the value of the voltage error integral value Sv2 has become 0, where $$Sv2=\int\{Ks(Io2-Is2)+Vs2-Vo2\}dt \quad (1).$$

2. The welding control apparatus according to claim 1, wherein the waveform generator generates the second pulse waveform by calculating, based on a formula (2), an addition/reduction value to increase or decrease a value of the peak period of the second pulse period among the preset waveform parameters with respect to a setting value, and
   the waveform generator receives, as parameters in the formula (2), inputs of preset various data of information regarding a reference value Tb2ref of the base period of the second pulse period and a change gain Kstp for the peak period of the second pulse period, and calculates an addition/reduction value $\Delta Tp2(n)$, expressed by the formula (2), of the peak period of the second pulse period in the current n-th pulse cycle by using the received various data of the information and an actually measured value Tb2(n−1) of the base period of the second pulse period in the preceding (n−1)-th pulse cycle, where $$\Delta Tp2(n)=Kstp\{Tb2ref-Tb2(n-1)\} \quad (2).$$

3. The welding control apparatus according to claim 2, wherein the waveform generator compares a maximum value of an increase range and a maximum value of a decrease range for the addition/reduction value $\Delta Tp2(n)$, which are set in advance such that the value of the peak period of the second pulse period is held at a proper value, with a calculation result of the addition/reduction value $\Delta Tp2(n)$ of the peak period of the second pulse period, and generates the second pulse waveform by setting the addition/reduction value, by which the value of the peak period of the second pulse period is increased or decreased with respect to the setting value, to the maximum value of the increase range or the maximum value of the decrease range when an absolute value of the calculation result exceeds the maximum value of the increase range or the maximum value of the decrease range.

4. The welding control apparatus according to claim 1, wherein the waveform generator generates the second pulse waveform by calculating, based on a formula (3) given below, an addition/reduction value to increase or decrease a value of the peak current in the second pulse period among the preset waveform parameters with respect to a setting value, and
   the waveform generator receives, as parameters in the formula (3), inputs of preset various data of information regarding a reference value Tb2ref of the base period of the second pulse period and a change gain Ksip for the peak current in the second pulse period, and calculates an addition/reduction value $\Delta Ip2(n)$, expressed by the formula (3), of the peak current in the second pulse period in the current n-th pulse cycle by using the received various data of the information and an actually measured value Tb2(n−1) of the base period of the second pulse period in the preceding (n−1)-th pulse cycle, where $$\Delta Ip2(n)=Ksip\{Tb2ref-Tb2(n-1)\} \quad (3).$$

5. The welding control apparatus according to claim 4, wherein the waveform generator compares a maximum value of an increase range and a maximum value of a decrease range for the addition/reduction value $\Delta Ip2(n)$, which are set in advance such that the value of the peak current in the second pulse period is held at a proper value, with a calculation result of the addition/reduction value $\Delta Ip2(n)$ of the peak current in the second pulse period, and generates the second pulse waveform by setting the addition/reduction value, by which the value of the peak current in the second pulse period is increased or decreased with respect to the setting value, to the maximum value of the increase range or the maximum value of the decrease range when an absolute value of the calculation result exceeds the maximum value of the increase range or the maximum value of the decrease range.

6. A welding system comprising:
   a welding control apparatus according to claim 1;
   a wire feeder for feeding a wire to a torch through a wire feed path from a wire container;
   a welding power supply for driving the wire feeder and supplying a welding current to the wire, fed from the wire feeder to the torch, in accordance with a welding command signal which is output by the welding control apparatus based on the first pulse waveform and the second pulse waveform;

an arc welding robot for holding the torch and moving the torch; and a robot control apparatus including a control panel through which commands indicating a welding path and welding work conditions are input, and controlling the arc welding robot in accordance with the input commands.

7. An arc length control method for use with a welding control apparatus, the arc length control method being used in pulse arc welding of consumed electrode type that carbon dioxide or a gas mixture containing carbon dioxide as a main component is used as shield gas, and that a first pulse waveform for releasing a droplet of molten metal from a wire distal end and a second pulse waveform for shaping the droplet are output, as two types of pulse waveforms differing in at least one of a pulse peak current and a pulse width, during one pulse cycle in order named for transfer of one droplet, the welding control apparatus being operated to alternately generate the two types of pulse waveforms based on preset waveform parameters to be output to the welding power supply, and to immediately change over, when the constriction of the droplet is detected, a current value of a first pulse to a predetermined value lower than a current value at the time of detection of the constriction, the pulse cycle being made up of a first pulse period including a peak period and a base period of the first pulse waveform and a second pulse period including a peak period and a base period of the second pulse waveform, the arc length control method comprising the steps of:

detecting a welding current during the welding;

detecting a welding voltage during the welding;

receiving, as parameters in a formula (1), inputs of preset various data of information regarding a gradient Ks of an external characteristic of the welding power supply, a welding current setting value Is2 in the second pulse period, and a welding voltage setting value Vs2 in the second pulse period;

receiving, as the parameters in the formula (1), inputs of various data of information regarding an instantaneous value Io2 of the welding current and an instantaneous value Vo2 of the welding voltage, which are detected in the second pulse period;

starting calculation of a voltage error integral value Sv2 expressed by the formula (1) from a time when the first pulse period ends and the second pulse period starts in the pulse cycle, and bringing the calculation to an end at a time when a result of the calculation has become 0;

comparatively determining whether a value of the voltage error integral value Sv2 provided as the calculation result has become 0; and for each pulse cycle, terminating the relevant pulse cycle and starting a next pulse cycle at a time when the value of the voltage error integral value Sv2 has become 0, in a process of alternately generating the two types of pulse waveforms, where $$Sv2 = \int \{Ks(Io2-Is2)+Vs2-Vo2\}dt \quad (1).$$

\* \* \* \* \*